(12) United States Patent
Shapiro et al.

(10) Patent No.: US 11,743,689 B2
(45) Date of Patent: Aug. 29, 2023

(54) CLIENT-RENDERABLE ELEMENT FOR INDOOR BUILDING MAP

(71) Applicant: Microsoft Technology Licensing, LLC, Redmond, WA (US)

(72) Inventors: Simon Levi Shapiro, Bellevue, WA (US); David Ross Buerer, Woodinville, WA (US); Derek Richard Westcott, Kirkland, WA (US); Andrew Alan Bell, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/721,143

(22) Filed: Apr. 14, 2022

(65) Prior Publication Data

US 2022/0240055 A1  Jul. 28, 2022

Related U.S. Application Data

(63) Continuation of application No. 16/917,098, filed on Jun. 30, 2020, now Pat. No. 11,310,629.

(51) Int. Cl.
*H04W 4/029* (2018.01)
*H04W 4/33* (2018.01)
(Continued)

(52) U.S. Cl.
CPC .......... *H04W 4/029* (2018.02); *G06T 11/60* (2013.01); *G06T 13/80* (2013.01); *H04W 4/33* (2018.02);
(Continued)

(58) Field of Classification Search
CPC .......... H04W 4/029; H04W 4/33; G06T 11/60
(Continued)

(56) References Cited

U.S. PATENT DOCUMENTS

| 8,965,688 B2 | 2/2015 | Bandyopadhyay et al. |
| 2009/0043504 A1 | 2/2009 | Bandyopadhyay et al. |

(Continued)

FOREIGN PATENT DOCUMENTS

| EP | 2982936 A1 | 2/2016 |
| KR | 20180109410 A | 10/2018 |

OTHER PUBLICATIONS

"Non Final Office Action Issued in U.S. Appl. No. 16/672,391", dated Jul. 1, 2022, 15 Pages.
(Continued)

*Primary Examiner* — Thomas J Lett
(74) *Attorney, Agent, or Firm* — Ray Quinney & Nebeker; Tiffany Healy

(57) ABSTRACT

A computerized mapping system is provided, including a map server configured to, in a map serving phase, receive a request from a client device to view a portion of a map at least partially including a building for which an indoor map is available, at a requested level of detail that is outside a range for displaying the indoor map, and transmit a target tile with a prerendered bitmap image for the building, and a client-side renderable geometric element with a perimeter and a client-side renderable visual feature of the internal map feature of the indoor map selected according to a selection criterion set by an authorized user of the indoor map, to the client device for display.

20 Claims, 14 Drawing Sheets

(51) Int. Cl.
*G06T 11/60* (2006.01)
*G06T 13/80* (2011.01)
*H04W 12/06* (2021.01)

(52) U.S. Cl.
CPC ......... *H04W 12/06* (2013.01); *G06T 2200/16* (2013.01); *G06T 2210/36* (2013.01)

(58) Field of Classification Search
USPC ...................................................... 455/456.2
See application file for complete search history.

(56) References Cited

U.S. PATENT DOCUMENTS

| 2015/0103102 | A1* | 4/2015 | Bailiang | G06T 19/20 345/672 |
|---|---|---|---|---|
| 2015/0142391 | A1 | 5/2015 | Flynn et al. | |
| 2015/0154267 | A1 | 6/2015 | Bailiang et al. | |
| 2016/0005238 | A1 | 1/2016 | Bailiang | |
| 2017/0031925 | A1 | 2/2017 | Mishra et al. | |
| 2018/0348985 | A1* | 12/2018 | Shelby | G01C 21/3614 |

OTHER PUBLICATIONS

"Notice of Allowance Issued in U.S. Appl. No. 16/672,391", dated Oct. 28, 2022, 15 Pages.

* cited by examiner

CLIENT-RENDERABLE ELEMENT FOR INDOOR BUILDING MAP

RELATED APPLICATION

This application is a Continuation of U.S. application Ser. No. 16/917,098 titled "CLIENT-RENDERABLE ELEMENT FOR INDOOR BUILDING MAP" filed Jun. 30, 2020, which is incorporated herein by reference in its entirety.

BACKGROUND

Computerized mapping platforms offer users the convenience of near instant access to a dizzying array of geospatial information. As the information available proliferates, a challenge exists to effectively present a map at an appropriate level of detail, without overwhelming the user with too much information. However, mere paring down of the information to a smaller set of data can leave the user unaware of the greater detail of information that is potentially available, possibly missing out on opportunities to discovery new places, or access desired information. Opportunities exist to address these challenges and improve the user experience of computerized mapping platforms.

SUMMARY

A computerized mapping system according to a first aspect is provided, including a map server configured to, in a map data preparation phase, generate map data organized into a series of tiles of varying levels of detail, the map data including an indoor map of a building, and generate a client-side renderable geometric element including a perimeter of the building and a client-side renderable visual feature of an internal map feature of the indoor map. The client-side renderable geometric element is generated at least in part by determining the perimeter based on data contained in the indoor map, selecting the internal map feature from a plurality of internal map features based on a selection criterion set by an authorized user of the indoor map, and generating the client-side renderable visual feature for the selected internal map feature, to visually communicate the selected internal map feature on the client-side renderable geometric element. The map server is configured to associate the client-side renderable geometric element with one or more of the tiles. The map server is further configured to, in a map serving phase, receive a request from a client device to view a portion of the map at least partially including the building for which the indoor map is available at a requested level of detail that is outside a range for displaying the indoor map, and transmit a target tile with a prerendered bitmap image for the building, and the client-side renderable geometric element with the perimeter and the client-side renderable visual feature of the internal map feature of the indoor map selected according to the selection criterion set by the authorized user of the indoor map, to the client device for display.

In the computerized mapping system according to the first aspect, a geometric element is displayed that provides a visual indication to a user that an indoor map is available when the map is viewed a level of detail that is out of range for displaying the indoor map, and displays information regarding an internal map feature of the indoor map that is specified by an authorized user of the indoor map. In this way, the mapping system can provide a mechanism to reduce visual clutter in the map, while still affording an authorized user such as a developer associated with the indoor map to specify a particular internal map feature that is visually communicated to map users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

One type of detail that has recently appeared on online maps is building footprints. These footprints can be generated using deep neural networks that analyze satellite imagery and auto-generate building footprints. These building footprints are typically indicated as perimeter outlines around where the building was detected by the deep neural network. Another type of detail that has recently appeared in online maps is the ability to access some indoor maps for certain locations, such as shopping centers, train stations, etc. The addition of building footprints for all buildings, and indoor maps for only a few of the buildings, has created a challenge for users to recognize which of the buildings indicated by building footprint have indoor maps available. Further, due to the very small scale of the features in indoor maps as compared to outdoor maps, another challenge occurs if the detail within an indoor map is presented to a user viewing the map at a relatively low level of detail (i.e., zoomed out), the detail inside the indoor map can appear extremely small and jumbled, to the point of being difficult to comprehend.

These problems are compounded in suburban and urban environments with multiple buildings on a single map. Adding further detail to maps such as indoor map data for multiple buildings in view may potentially cause a large amount of visual clutter that may overwhelm the user, and potentially degrade the user's experience of the mapping system. For example, a user may be viewing multiple indoor buildings that are located nearby each other on a map. As a specific example, the user may want to view indoor data for a parking garage, and then may want to view indoor data for a mall located near the garage. However, indoor map data may be visually dense, and showing multiple indoor maps at the same time can be visually cumbersome. For example, simultaneously showing the indoor plans for the parking garage, mall, movie theater, etc., may potentially add visual noise that will decrease the user's experience of the mapping system.

Figure 1:
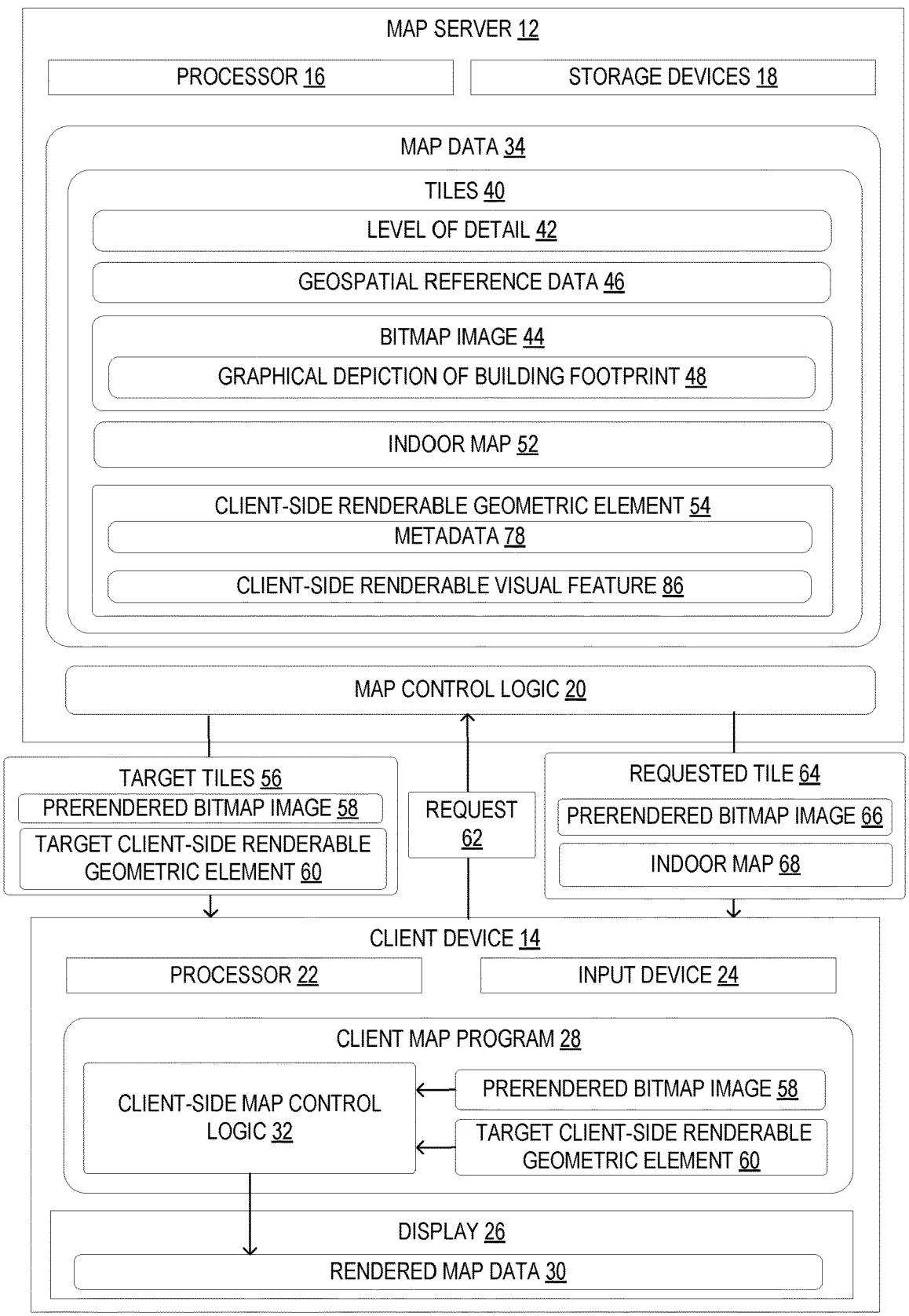
FIG. 1 shows a schematic view of a computerized mapping system that includes client-side renderable geometric elements according to one embodiment of the present disclosure.

To address these issues, FIG. 1 illustrates an example computerized mapping system 10 that provides clickable geometric elements that allow users to switch between different indoor maps. The computerized mapping system 10 includes a map server 12 and one or more client devices 14. The map server 12 may include a plurality of server devices that may operate in a cloud computing configuration. The map server 12 includes at least one processor 16, storage devices 18 such as volatile and non-volatile storage devices, and other suitable computer components to perform the functions described herein. The at least one processor 16 of the map server 12 is configured to execute map control logic 20 stored on storage devices 18 that includes a mapping technology stack including functions such as rendering, control, geocoding, autosuggest, routing, and other mapping service functions.

The client device 14 includes a processor 22, an input device 24 such as a capacitive touch screen, keyboard, and mouse, etc., a display 26, and other suitable computer components such as volatile and non-volatile storage devices. The processor 22 of the client device 14 is configured execute a client map program 28 configured to handle client-side user input received via the input device 24, such as map navigation and zoom inputs, and display rendered map data 30 via the display 26. In one example, the map server 12 may be configured to send a package of map control logic 20 to the client device 14 in response to a user triggering a map experience. The map control logic 20 may be locally executed as client-side map control logic 32 within the client map program 28. In this manner, the client-side map control logic 32 may be configured to perform the functions of the map control logic 20, such as control, geocoding, autosuggest, routing, and other mapping service functions.

It should be appreciated that the client map program 28 may take any suitable form, such as, for example, code executed within a browser, an application program executed on the client device 14, etc. As a specific example, the map control logic 20 may be sent to the client device 14 in the form of a modified JavaScript Object Notation program, and may further include relevant portions of map data 34 for the user of the client device 14. The map control logic 20 may be executed as the client-side map control logic 32 within the client map program 28 which may take the form of a browser program, or an application being executed within a browser program.

Figure 2:
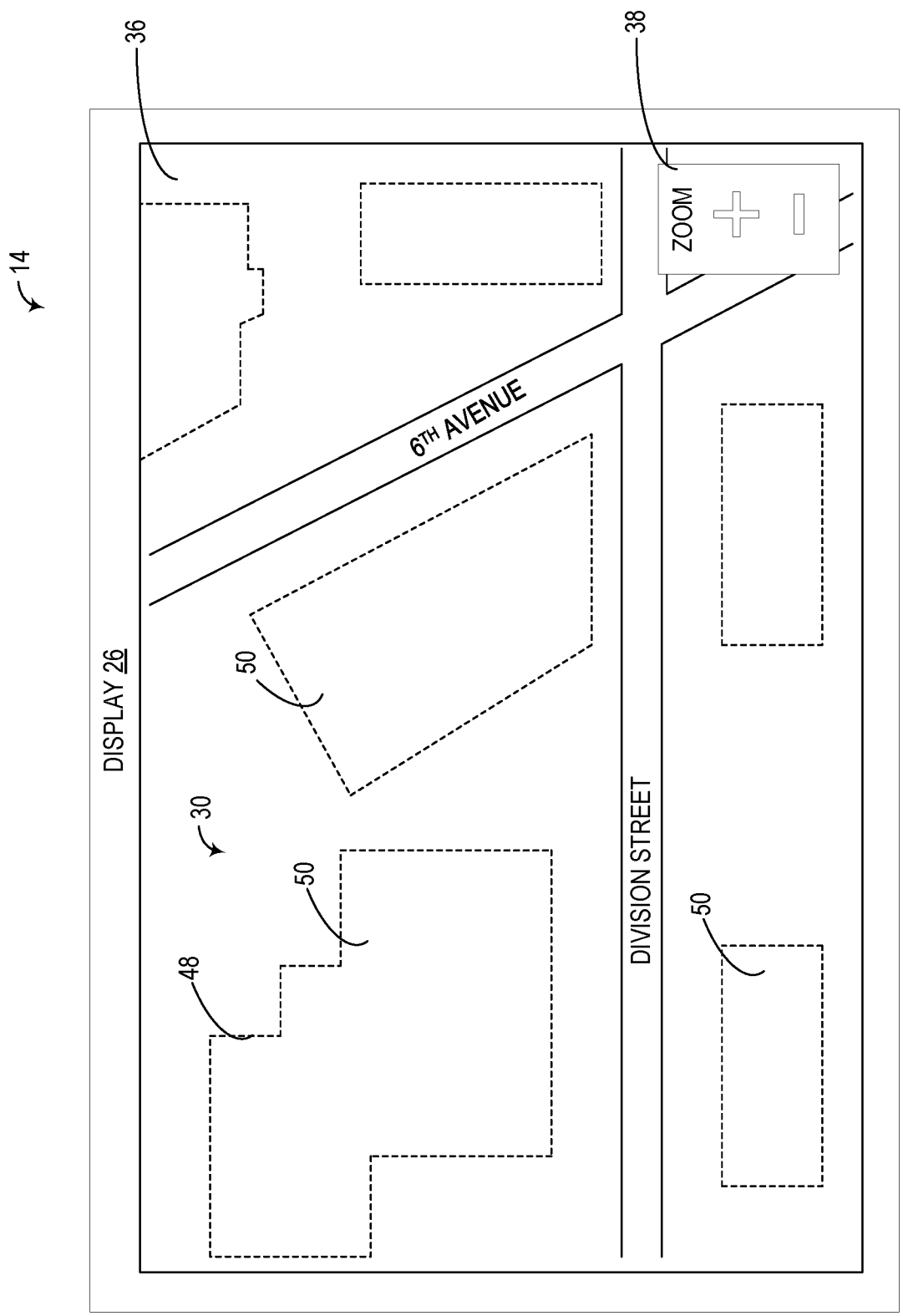
FIG. 2 shows an example portion of a map displayed in a graphical user interface of a client application program of the computerized mapping system of FIG. 1.

FIG. 2 illustrates an example graphical user interface (GUI) 36 of the client map program 28 being presented via the display 26 of the client device 14. The GUI 36 may include a view of the rendered map data 30. The rendered map data 30 may include rendered bitmap image data that is rendered by the map server 12, as will be discussed in more detail below. The client map program 28 may be configured to handle display of relevant portions of the rendered map data 30 for a user's current view in the GUI 36. The GUI 36 may also include navigation controls such as, for example, a zoom control 38 that receives a user zoom input. It should be appreciated that the GUI 36 may include other types of navigation controls. Additionally, it should be appreciated that the GUI 36 of the client map program 28 may receive user input via other input modalities. For example, a user may enter a zoom input via a pinching or spreading gesture input to a capacitive touch screen input device. As another example, a user may enter a navigation input via a finger drag gesture input. In a desktop computer example, the user may enter input via a click-and-drag input of a mouse, or by pressing arrow keys on a keyboard. It should be appreciated that the client map program 28 is not limited to the input modalities and techniques described above, and may receive user inputs via any suitable method.

Turning back to FIG. 1, the map server 12 is configured to generate map data 34 that is organized into a series of tiles 40 of varying levels of detail 42. The levels of detail 42 may be associated with different thresholds of zoom levels on the client side. The levels of detail 42 include decreasing or increasing the complexity of rendered images for the tiles 40 for various zoom levels that may be selected by the client device 14. Each tile 40 may include an associated bitmap image 44 of a portion of a map rendered at a specified level of detail 42. Thus, for each level of detail 42, there will be a set of tiles 40 that include bitmap images 44 that combine into an image of the map at that level of detail 42.

Each tile 40 also include geospatial reference data 46 for that tile 40 and each object represented in the tile 40. The geospatial reference data 46 may be used by the map control logic 20 and the corresponding client-side map control logic 32 for geopositioning, rendering, and presenting map data. In one example, the geospatial reference data 46 may include latitude and longitude values for objects and/or references positions or locations in the data for the that tile 40.

The bitmap images 44 of a subset of the tiles 40 may include graphical depictions of building footprints 48 for a plurality of buildings 50. Example renderings of building footprints 48 for a plurality building 50 are shown in FIG. 2. As shown, the building footprints 48 may include a line or line segments indicating a perimeter or footprint of each building 50. The geospatial reference data 46 for each tile may also include geospatial references for each building footprint 48.

Figure 3:
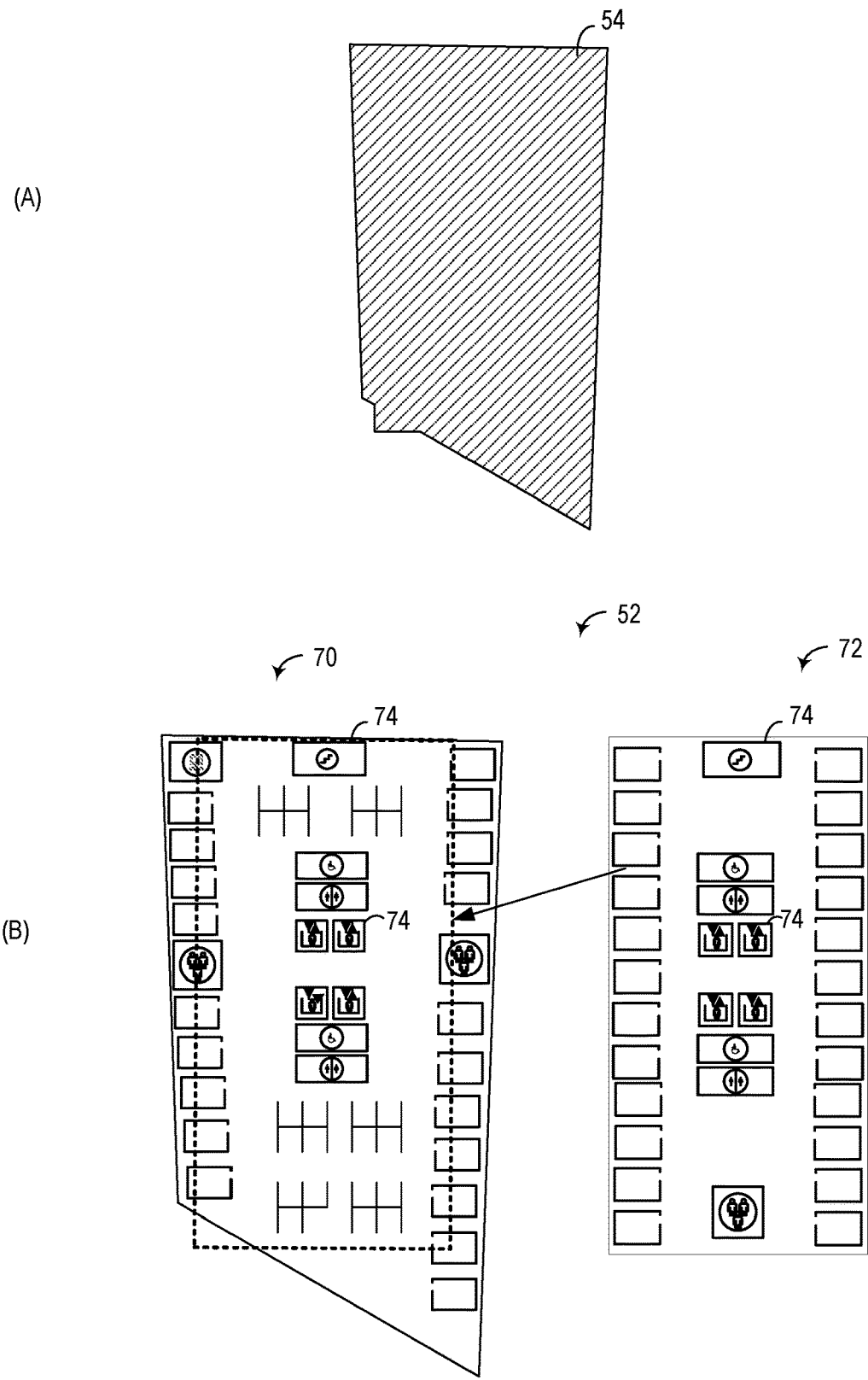
FIG. 3 shows an example geometric element generated based on a join of two floors in a floor map for the computerized mapping system of FIG. 1.

Turning back to FIG. 1, the map data 34 may further include an indoor map 52 for each of a subset of the plurality of buildings 50. An example indoor map is shown in FIG. 3, which will be discussed in more detail below. Each indoor map 52 is geospatially referenced in the geospatial reference data 46. In one example, the indoor maps 52 may be mergeable with the bitmap images 44 at specified levels of detail 42. In one example, the map server 12 may be configured to render the indoor maps 52 in the bitmap images 44. That is, at specified levels of detail 42, the tiles 40 for those specified levels of detail 42 may include rendered indoor maps 52 included in the bitmap images 44 of the surrounding outdoor map. In another example, as will be discussed in more detail below, the indoor maps 52 may be client-side rendered and merged with the server-side rendered bitmap images 44. The specified levels of detail 42 may be selected based on a complexity of the indoor map. That is, relatively simple indoor maps may be shown at a farther zoom level while more complex indoor maps may not be shown until the user has zoomed to a closer zoom level. As another example, a default level of detail 42 may be specified for all indoor maps 52.

In one example, the map server 12 may be configured to render the indoor maps 52 in the bitmap images 44 for the corresponding tile 40. Thus, the bitmap image 44 would include image data for both the outdoor map, graphical depictions of building footprints 48, and indoor maps 52 that are geospatially located in the portion of the map covered by that tile. In another example, the indoor maps 52 may be stored separately from the bitmap image 44 data. However, as the indoor maps 52 are geospatially referenced, the map server 12 may be configured to merge an indoor map 52 with the bitmap image 44 of a tile 40 that contains that indoor map 52 based on the geospatial reference data 46. In another example, the bitmap images 44 and the data for the indoor map 52 may be sent to the client, and the client may render the indoor map 52 and merged the rendered data with the bitmap image 44 based on the geospatial reference data 46. Storing the indoor maps 52 separately from the bitmap images 44 may provide data security advantages. For example, specific indoor maps 52 may be designated as a private indoor map accessible only by authorized users, and the map server 12 may be configured to confirm whether a user is authorized to view the private indoor map prior to transmitting the tiles containing the private indoor map or merging the private indoor map with the corresponding tile.

As illustrated in FIG. 1, the map server 12 may be further configured to generate client-side renderable geometric elements 54 for each indoor map 52. Each client-side renderable geometric element 54 includes a perimeter of an associated building and a client-side renderable visual feature for an internal map feature of the indoor map for that building. After generation, each client-side renderable geometric element 54 is associated with one or more tiles 40 that include the building 50 for the indoor map 52 associated with that client-side renderable geometric element 54. In some cases, a building 50 may be split across multiple tiles 40. That is, half of a building 50 may be located on one tile, while the other half extends into another tile 40. In these cases, the client-side renderable geometric element 54 may be associated with each tile 40 that includes that building 50. Using techniques that will be described below, each client-side renderable geometric element 54 may be programmatically generated by the map server 12 based on the indoor maps 52. By use of the term client-side renderable, it is meant that the geometric element is rendered from a geometric definition (such as a set of geospatially referenced geometric data points defining a polygon, etc.) into a bitmap containing pixel data suitable for display on a display associated with the client device. This can be distinguished from server-side rendered bitmaps, for which the bitmap data itself (i.e., pixel data) is generated (rendered) on the server and transmitted as pixel data to the client device. An advantage of client-side rendering of the geometric element 54 is that it can be imparted with interactive functionality, such as the hover and selection (click or tap) behaviors discussed below, including the feature of sending a request to the server to display the map at particular coordinates and level of detail, which causes the indoor map to be displayed. While server-side rendered images have the advantage of processing speed and access to large data stores, this client-side interaction functionality would not typically be available in server side rendered bitmap images.

The map server 12 may be configured to generate the client-side renderable geometric element 54 at least in part by determining the perimeter based on data contained in the indoor map 52, selecting an internal map feature 84 from a plurality of internal map features 84 based on a selection criterion set by an authorized user of the indoor map 52, and generating the client-side renderable visual feature 86 for the selected internal map feature 58, to visually communicate the selected internal map feature on the client-side renderable geometric element. The perimeter may be determined as described herein, for example, via a join operation on the floors of the indoor map for the building. The selection of the internal map feature may be accomplished, for example, by an authorized user accessing a map application programming interface and uploading the indoor map along with a value for the selection criterion. The value may indicate that the authorized user desires to have a particular venue (e.g., "Joe's Restaurant"), venue type (e.g., Italian restaurants), facility (e.g., "First floor lobby") or facility type (public restrooms), or other feature of the indoor map described herein to be represented by the client-side renderable visual feature. It will be appreciated that other internal map features besides those indicated by the authorized user are typically not included in the client-side renderable geometric element, to avoid visual clutter. In this way the client-side renderable visual feature communicates in a visually distinguishing manner that the internal map feature is present within the indoor map, without displaying overly detailed information from the indoor map. In addition to the above, the authorized user may set a programmatic definition for the internal map feature. For example, the authorized user may use the map application programming interface to set the selection criterion to be a least crowded area of the indoor map for this time and date, all areas that are currently less crowded than a predetermined density threshold, a most highly rated area of the indoor map, all areas currently open for business within the indoor map, or a promoted area of the indoor map, with the data for crowd density, ratings, promotions, or open/closed information coming from the data feeds described elsewhere herein. It will be appreciated that by providing such selection criterion, the authorized user for the indoor map can curate the information that is made available to the public, to provide more useful and relevant information to potential visitors. Particularly in the time of the rise of communicable diseases such as COVID19, information on areas of an indoor map with lowest crowd density or crowd density below an acceptable predefined threshold such as a crowd density that can satisfy a minimum of 6 ft distance between persons, can provide reassurance to visitors that they can effectively maintain social distancing in those areas of the building during a visit.

When a user of a client device 14 triggers an experience for the mapping service, the client map program 28 may call/communicate with the map server 12, and receive map control logic 20 to be executed as client-side map control logic 32 within the client map program 28. For example, the user may trigger a mapping service experience by opening a mapping application on the client device, interacting with an electronic meeting invitation that includes directions to the meeting, or another type of user interaction that triggers the mapping service. After triggering the mapping service, the client map program 28 may send a request for tiles 40 to be displayed, the request including an address or coordinates for a location to be displayed to the map server 12.

The map server 12 receives the request from the client device 14 to view a portion of the map include a building for which an indoor map is available. The portion of the map to be displayed may be determined based on the requested address or coordinates, and the geospatial reference data 46 associated with the tiles 40. In some examples, the request from the client device 14 may further include a requested level of detail 42 that may be determined based on a current zoom level of the client map program 28. The map server 12 determines at least one target tile 56 that is included in the portion of the map requested by the client device 14 at the requested level of detail 42. In one example, the requested level of detail 42 is outside of a range for displaying the indoor maps 52 in the requested portion of the map. The map server 12 may be configured to transmit the target tile 56 with a prerendered bitmap image 58 for the building, and the client-side renderable geometric element with the perimeter and the client-side renderable visual feature of the internal map feature of the indoor map selected according to the selection criterion set by the authorized user of the indoor map, to the client device 14 for display.

The client device 14 may receive the target tiles 56 and map control logic 20. The client map program 28 may execute the received map control logic 20 as client-side map control logic 32 to display the prerendered bitmap image 58 at a suitable position, orientation, and zoom level within the GUI of the client map program 28. The client map program 28 may be further configured to render the target client-side renderable geometric element 60, and overlay the rendered target client-side renderable geometric element 60 at the position on the prerendered bitmap image 58 indicated by the geospatial reference data 46 for the geometry element. The combined prerendered bitmap image 58 and rendered target client-side renderable geometric element 60 may be presented via the display 26 as rendered map data 30.

The client map program 28 may further communicate client-side user inputs to the client-side map control logic 32, such as, for example, navigation inputs, zoom inputs, etc. In some examples, the client-side map control logic 32 may determine the positions, orientations, and zoom level to display the rendered map data 30, and the client map program 28 may handle navigation inputs and zoom inputs within the context of the rendered map data 30 on the client device 14.

In one example, the rendered client-side renderable geometric element 60 is selectable via user input to the input device 24 of the client device 14. Upon selection of the rendered client-side renderable geometric element 60, the client map program 28 may be configured to transmit a request 62 to the map server 12 indicate the user selection of the geometric element 60. In one example, the request 62 may include an identifier for the selected geometric element 60. The may server 12 receives the request 62 indicating the selection of the client-side renderable geometric element 54 from the client device 14, and identifies which client-side renderable geometric element 54 was selected by the user. For example, the map server 12 may compare an identifier included in the request 62 to a list of identifiers for all of the client-side renderable geometric elements 54 stored on the map server 12.

Next, in response to receiving the selection indicated by request 62, the map server 12 causes an indoor map of the building to be displayed at the client device 14. In one example, the indoor map may be server-side rendered by the map server 12. In another example, data for the indoor map may be sent to the client device 14, and the client device 14 may be configured to render the indoor map and merge the rendered indoor map data with the prerendered bitmap image data using the techniques described herein. The map server 12 determines the building and indoor map 52 associated with the client-side renderable geometric element 54 selected by the user. The map server 12 transmits tiles 40 that include the indoor map 52 of the building that is associated with the client-side renderable geometric element 54 selected by the user of the client device 14.

The client device 14 may receive the requested tiles 64 that were associated with the selected geometric element. As illustrated in FIG. 1, the request tiles 64 may include prerendered bitmap images 66 and the indoor map 68 of the building associated with the selected geometric element. In one example, the map server 12 may be configured to combine the prerendered bitmap image 66 and the indoor map 68 in combined rendered data. In another example, the prerendered bitmap image 66 and the indoor map 68 may be separate, but may both be geospatially referenced. In this example, the client map program 28 may be configured to merge the prerendered bitmap image 66 and the indoor map 68 based on the geospatial reference data, and display the combined rendered map data within a map view window of the client map program 28 on the display 26.

Examples of selectable geometric elements will now be described. FIG. 3 at (A) illustrates an example client-side renderable geometric element 54. In one example, the map server 12 may be configured to generate the client-side renderable geometric element 54 as a two-dimensional polygon formed in a location of one of the buildings. The example client-side renderable geometric element 54 is a two-dimensional polygon that is formed to match and outside perimeter of the associated building.

In one example, the client-side renderable geometric element 54 may be programmatically generated by the map server 12 based on the indoor map 52 for the associated building. FIG. 3 at (B) illustrates an example of a building that has two floors in the floor map 52 including a first floor 70 and a second floor 72. As illustrated, the first and second floors of the floor map 52 have different shapes. Thus, in one example, the map server 12 may be configured to generate the client-side renderable geometric element 54 as a two-dimensional polygon that is shaped to be coextensive with a shape formed by a join of all floors of the indoor map of the building. That is, the map server 12 may join all of the floors in the floor map 52, such as the first floor 70 and the second floor 72, and may then generate a two-dimensional polygon based on the shape of the joined floors. To determine the join of the floor map 52, the map server 12 may be configured to determine anchor points 74 between the floors of the floor map 52.

The anchor points 74 may, for example, be objects that travel vertically through the building, and may thus be used to align the building floorplan data on top of each other. For example, the anchor points 74 may be determined based on identifying elevators or stairs in the floor map 52, as elevators and stairs typically extend vertically in a building through each floor. However, it should be appreciated that other types of anchor points may be identified, such as, for example, a support pillar that extends vertically through the building, a fire escape ladder, etc.

In one example, the anchor points 74 may be determined by identifying symbols or words in the floor map 52 that indicate an elevator, stairs, or other type of anchor point. In the example illustrated in FIG. 3 at (B), the anchor points 74 may be determined based on programmatically identifying the symbols used for the elevator and the stairs. In another example, the floor map 52 may include text that identifies different objects in the floorplan. Accordingly, the map server 12 may be configured to perform text processing on the floor map 52 to identify the terms "elevator", "stairs", or other objects being used as anchor points. In yet another example, the anchor points may be manually identified by a curator of the map server 12.

After determining the anchor points 74, each floor 70 and 72 of the floor map 52 may be joined by those anchor points 74. The joined floor map may then be used together to generate the polygon shape of the client-side renderable geometric element 54 shown in FIG. 3 at (A).

Each client-side renderable geometric element 54 may be programmatically generated in this manner for each indoor map 52 associated with one or more buildings. However, it should be appreciated that other techniques may also be used to generate the client-side renderable geometric element 54. For example, the map server 12 may use the graphical depiction of the building footprint 48 in the bitmap image 44 to generate the polygon of the geometric element. In another example, the maps server 12 may use satellite imagery to generate the polygon shape of the geometric elements 54. In yet another example, the polygon shape of the geometric elements 54 may be manually generated by a curator of the map server 12.

As discussed above, the target tiles 56 sent to the client device 14 include prerendered bitmap images 58 and target client-side renderable geometric elements 60 that are separate from the bitmap images 58. In one example, the target client-side renderable geometric elements 60 sent from the map server 12 to the client device 14 do not include bitmap data. Rather, the client-side renderable geometric elements 60 include data that may be used by the client map program 28 on the client device 14 to render the geometric element 60, and overlay the rendered geometric element on top of the prerendered bitmap image 58 according to the associated geospatial reference data 46.

Figure 4:
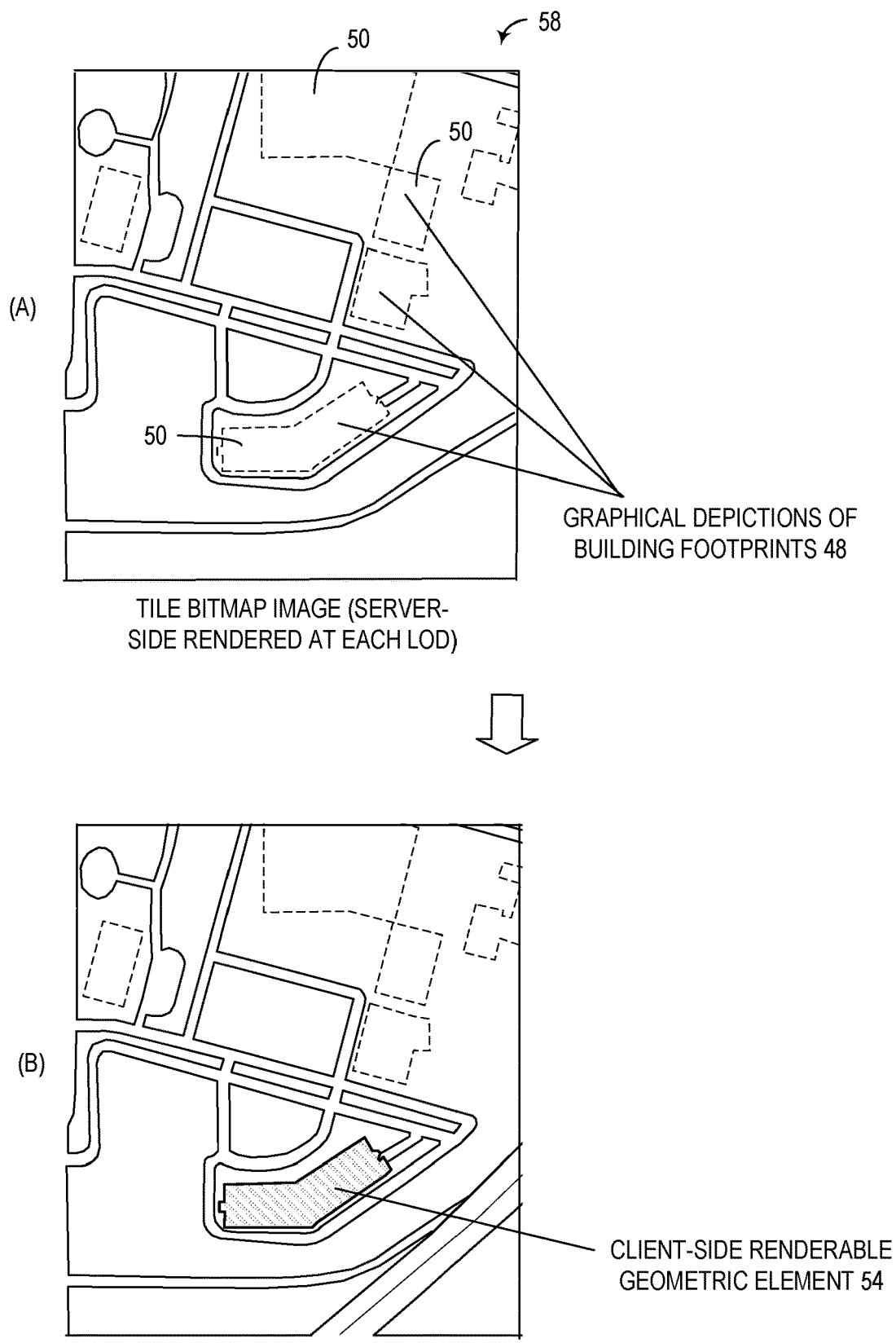
FIG. 4 shows an example bitmap image of a tile that includes graphical depictions of building footprints and client-side renderable geometric elements for the computerized mapping system of FIG. 1.

FIG. 4 at (A) illustrates an example if a prerendered bitmap image 58 sent form the maps server 12 to the client device 14. The prerendered bitmap image 58 is rendered by the map server 12. Additionally, as discussed above, the prerendered bitmap images 58 are rendered for each level of detail 42, and stored with the tiles 40. In the example illustrated in FIG. 4, the prerendered bitmap image 58 further includes graphical depictions of building footprints 48 for one or more buildings 50.

FIG. 4 at (B) illustrates an example of a client-side renderable geometric element 54 that was rendered by the client map program 28 and merged with the bitmap image 58. The rendered geometric element 54 has been overlaid onto the building 50 associated with that geometric element based on the geospatial reference data 46. The client-side renderable geometric element 54 shown in FIG. 4 at (B) is interactable by the user via user input to the client map program 28. For example, the user may select the client-side renderable geometric element 54 via a click input. The client map program 28 may receive the user input, interpret that user input as being directed to the client-side renderable geometric element 54, and may then transmit the selection to the map server 12.

Figure 5:
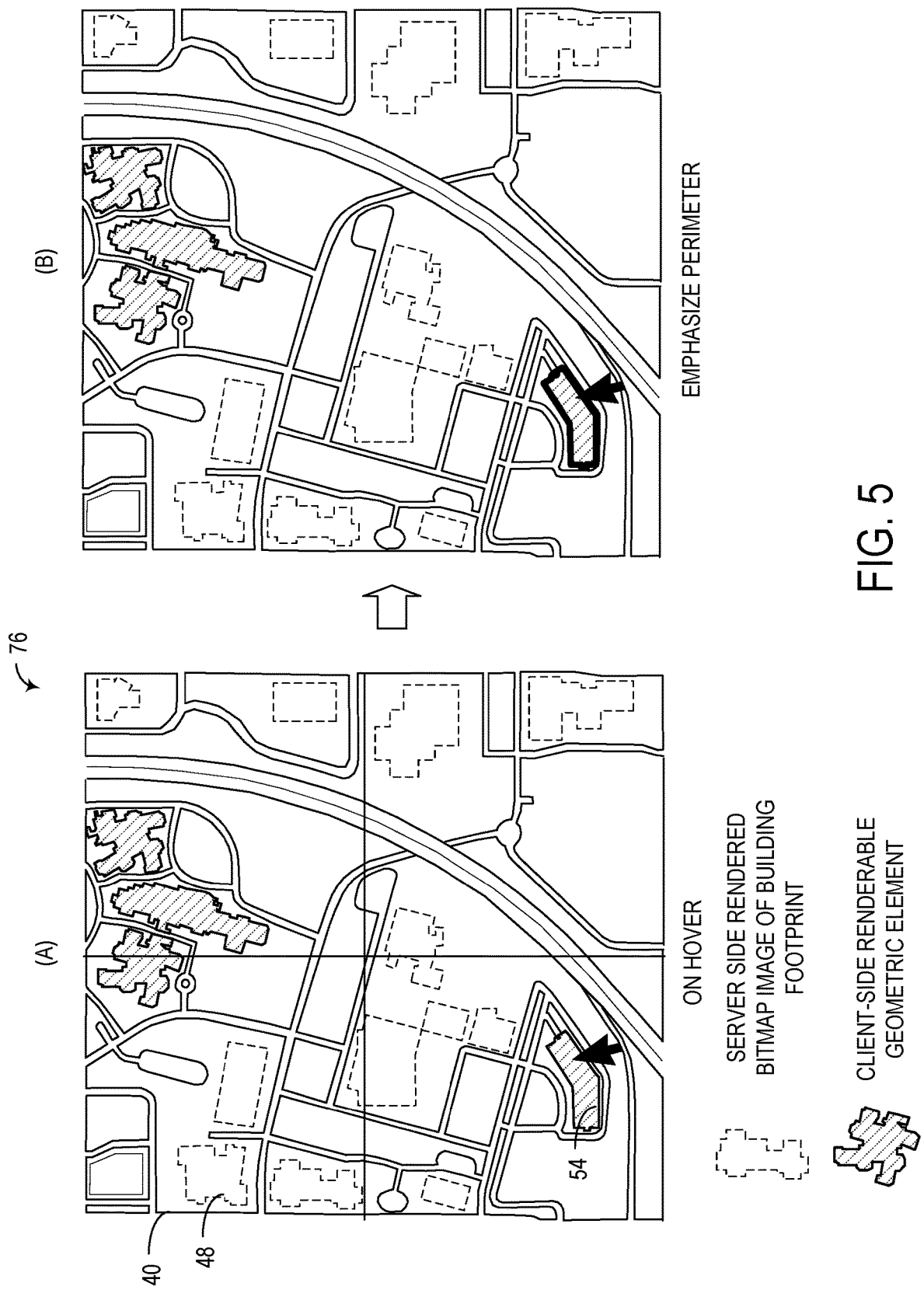
FIG. 5 shows an example of user interactions with a geometric element and visually distinguishing features of the geometric element for the computerized mapping system of FIG. 1.

Now turning to FIG. 5. The client device 14 may be configured to display a map image 76 including a plurality of tiles 40 within a map view of the client map program 28. Each tile 40 includes the server-side rendered bitmap image 44 including graphical depictions for building footprints 48. As discussed above, the client map program 28 may render the client-side renderable geometric elements 54 associated with the displayed tiles 40. The rendered geometric element 54 may be displayed over at least one of the building footprints 48 in the server-side rendered bitmap image 40. In the example illustrated in FIG. 5 at (A), the geometric element 54 is visually distinguishable from the building footprints 48 in the bitmap image 40. For example, the geometric element 54 may be rendered to have a visually distinguishing characteristic such as a highlight. As few other examples, the geometric element 54 may be rendered to include an outline, color, shading, line pattern, line weight, fill pattern, and brightness. However, it should be appreciated that other types of visually distinguishing characteristic serving to distinguish the client-side rendered geometric element 54 from the server side rendered building footprints 48 when displayed at the client device 14 may be used to render the geometric element 54.

As discussed above, the geometric element 54 is interactable by the user via input to the client device 14. In one example, the user may interact with the geometric element 54 via a selection input consisting of clicking on the geometric element 54. In another example, the user may interact with the geometric element 54 by hovering a pointer over the geometric element 54. FIG. 5 at (B) illustrates an example hover interaction. The client map program 28 may be configured to detect a pointer or digit hovering over the geometric element 54, and in response, change the visual appearance of the geometric element 54 at the client device 14.

In the example illustrated in FIG. 5 at (B), the visual appearance of the geometric element 54 is changed to emphasize a perimeter of the geometric element 54. For example, the geometric element 54 may be rendered to have a perimeter that is visually distinguished with a bold line weight compared to server-side rendered building footprints 48. However, it should be appreciated that the geometric element 54 may be visually changed in other manners. For example, the geometric element 54 may be rendered to include an animation when the user selects, hovers, or otherwise interacts with the geometric element. As a specific example, the animation may include moving line segments, a moving perimeter, a changing color, etc.

In another example, performing a change in level of detail 42 or a repositioning of the map causes a client-side animation that visually distinguishes the geometric element 54. For example, the user may change a zoom level of the client map program 28 via the zoom control 38, or may scroll the map in a vertical or horizontal direction. After detecting one of these user inputs, the client map program 28 may be configured to render the geometric elements 54 that are within view using a client-side animation. As a specific example, the geometric elements 54 may be rendered to fade out and fade back in as the user stops zooming or stops moving the map. In this manner, the existence of the geometric elements 54 may be visually communicated to the user via the animation.

It should be appreciated that the visual changes discussed above are merely exemplary, and that any other types of visual changes and animations may be used to visually distinguish the geometric elements 54 form the building footprints 48, and to indicate detection of a user interaction with the geometric elements 54.

Figure 6:
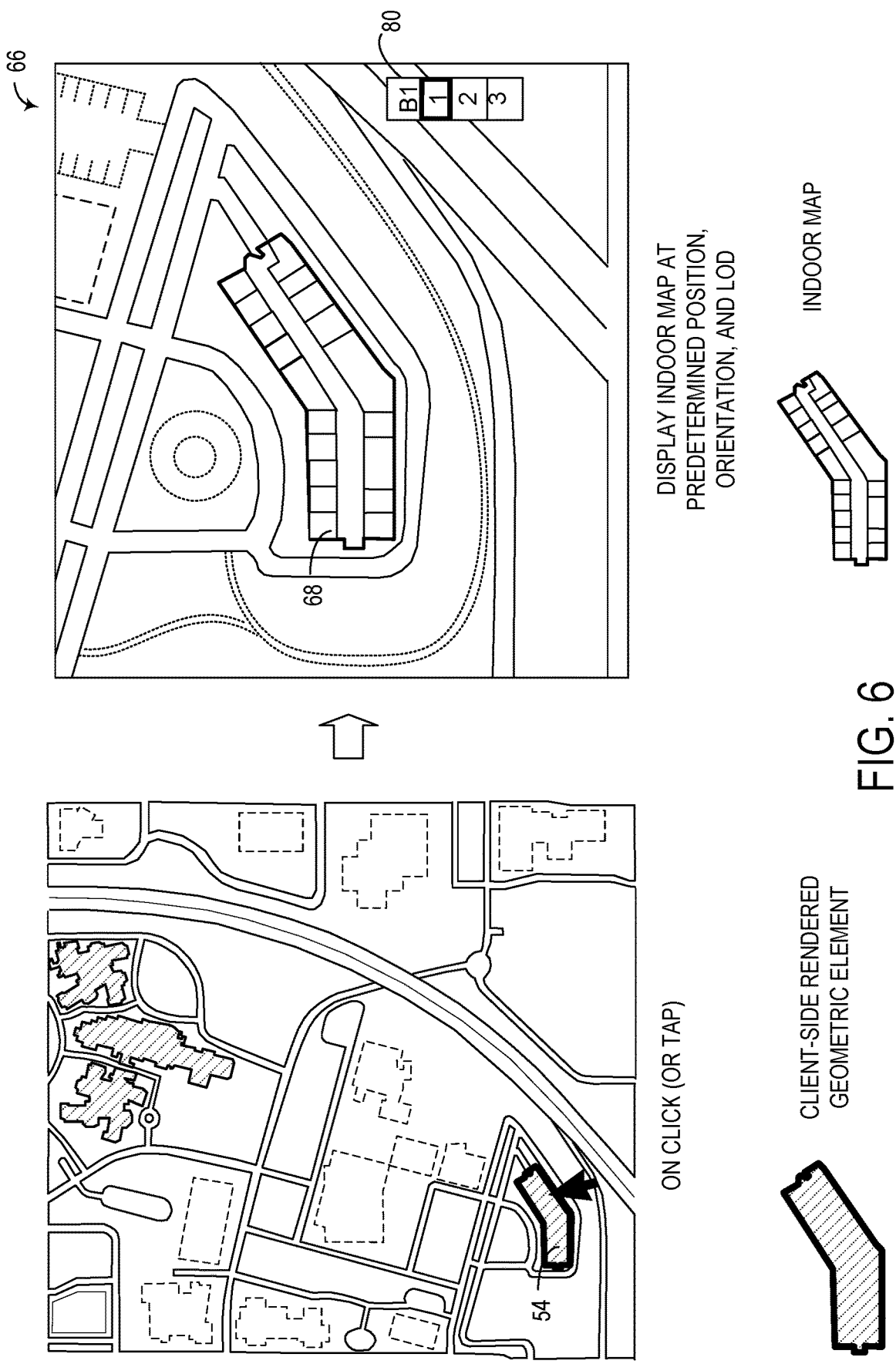
FIG. 6 shows an example indoor map being displayed in response to selection of a geometric element using the computerized mapping system of FIG. 1.

FIG. 6 illustrates an example user interaction where a user clicks on and selects a geometric element 54. The client map program 28 may be configured to detect the selection of the geometric element 54. As discussed above, in response to detecting the selection, the client map program 28 may send a request 62 including an identifier for the selected geometric element 54. The map server 12 receives the request 62 from the client device made in response to the selection of the client-side renderable geometric element at the client device, and transmits one or more tiles including an indoor map 68 of the building for display within a map view window of the client device 14. The requested tile(s) 64 typically include a server-side rendering of the indoor map 68 associated with the geometric element 54 selected by the user. In another example, the requested tile(s) 64 may include associated data for the indoor map 68, and the client device 14 may be configured to render the indoor map 68 and merge the rendered indoor map with the prerendered bitmap image data of the requested tile(s) 64 using the geospatial reference data.

Turning briefly to FIG. 1, each client-side renderable geometric element 54 is associated with metadata 78 that indicates a predetermined level of detail 42 and a predetermined position and orientation to display a tile 40 that includes an indoor map 68 associated with that client-side renderable geometric element 54 within the map view window of the client map program 28. After receiving the request 62 and identifying the selected geometric element, the map server 12 may determine the requested tile 64 that has the predetermined level of detail 42 indicated in the metadata 78. The requested tile 64 that includes prerendered bitmap images 66 and an indoor map 68 may then be sent to the client device 14 for display. As discussed above, in some examples, the map server 12 may be configured to merge the indoor map 68 and bitmap image 66 into a single rendered bitmap image that is sent to the client device. In another example, the client map program 28 may be configured to merge the bitmap image 66 and the indoor map 68 in the requested tile 64 based on the geospatial reference data 46.

In one example, the metadata 78 may be programmatically generated. For example, the predetermined level of detail 42 may be set to a default level that is suitable for indoor maps 52. In another example, the metadata 78 may be generated by a curator that determines a best level of detail 42 and positions and orientation for viewing the indoor map 52 associated with the geometric element 54. However, it should be appreciated that other techniques may be used to generate the metadata, such as, for example, crowd-sourcing a best fit metadata based on how users typically view the indoor map 52.

Turning back to FIG. 6, the selection of the geometric element 54 causes a server-side rendered indoor map 68 of the building associated with the selected geometric element 54 to be displayed. For example, as discussed above, selection of the geometric element 54 causes a request 62 to be sent for a tile. The requested tile 64 is transmitted to the client device 14. The requested tile 64 has a specified level of detail 42 that was specified in the metadata 78 associated with the selected geometric element. The client map program 28, in response to receiving the selection indicated by request 62, may then display the bitmap image 66 at the specified level of detail 42, and at a predetermined position and orientation indicated in metadata 78 associated with the selected geometric element 54.

In the example illustrated in FIG. 6, the requested tile 64 that includes prerendered bitmap image 66 and indoor map 68 that is merged with the bitmap image are presented via the client map program at the specified level of detail, position, and orientation. After the requested tile is displayed, the user may interact with the indoor map 68 via the client map program 28. For example, the user may select different floors in the indoor map 68 via a floor tool 80. In one example, when the displayed indoor map 68 includes multiple floors, the metadata 78 may further include a default floor to be initially displayed, such as, for example, the first floor. However, it should be appreciated that other floors may be used as the default floor, such as, the top floor, bottom floor, etc. The default floor may be set by a user of the client map program 28 for all indoor maps that will be displayed. In another example, the default floor map be set in metadata 78 by a curator of the map server 12.

To exit the view of the indoor map 68, the user may zoom out from the tile. When the zoom level reaches a threshold level that is outside the level of detail of the tile that contains the indoor map 68, a new tile will be displayed that does not contain the indoor map 68. For example, the new tile may be displayed to include a rendered geometric element at the location of the indoor map 68. In another example, the user may select a different geometric element 54 to move to a view of a different indoor map according to the techniques and processes discussed herein. In this manner, the user may easily switch between target indoor maps using the geometric elements 54.

Figure 7:
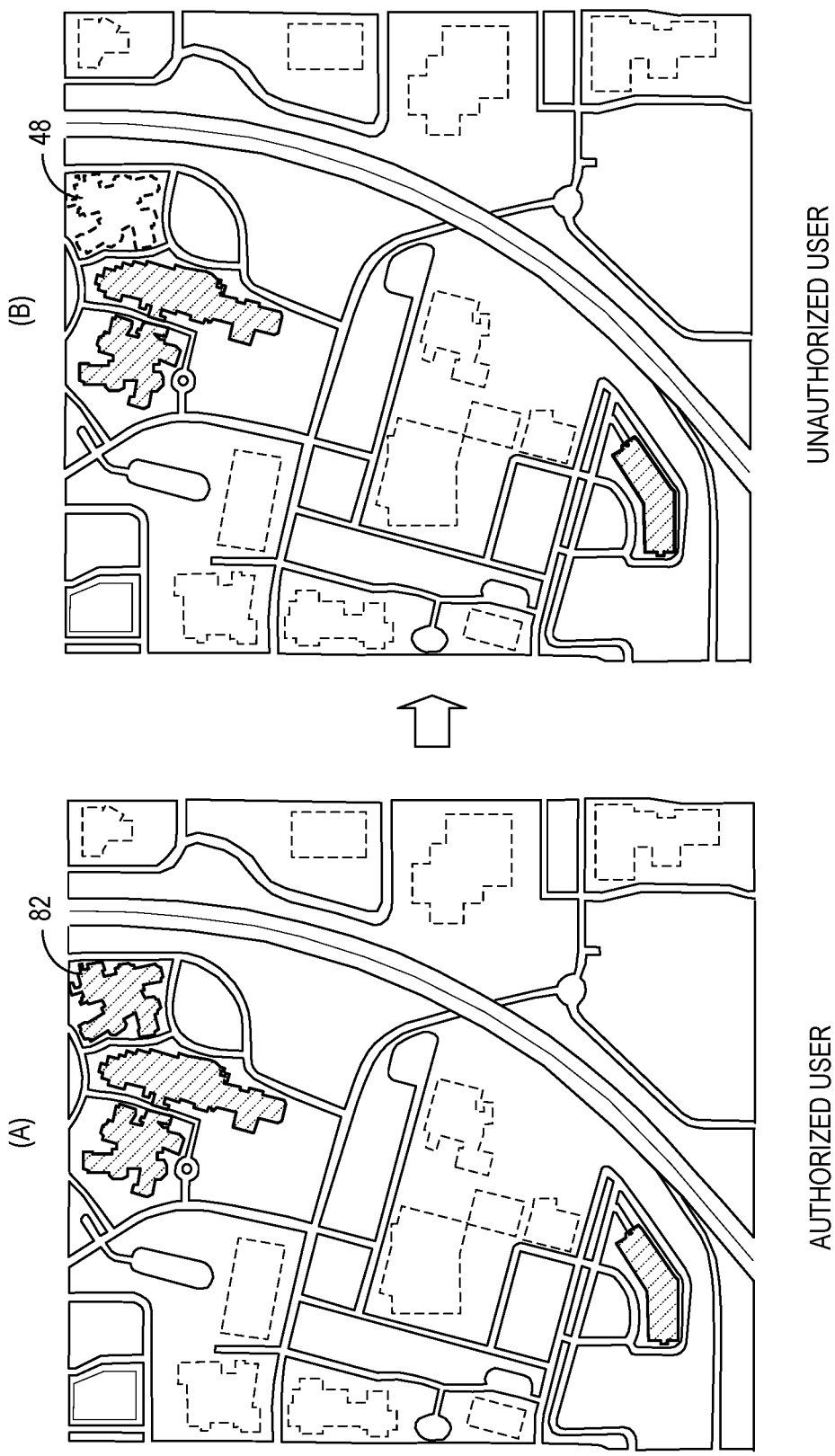
FIG. 7 shows an example authorized user viewing a geometric element associated with a private indoor map using the computerized mapping system of FIG. 1.

FIG. 7 illustrates an example where an indoor map 52 is a private indoor map accessible only by authorized users. In this example, the map server 12 may be configured to receive user authentication credentials, and confirm based on the user authentication credentials that the user is an authorized user who has authorization to access the indoor map 52, prior to transmitting the tiles 40 containing the indoor map 52 to the client device 14. As a specific example, the map server 12 may include authorization protocols to determine whether a client computer device 14 is authorized to access a private indoor map. For example, the map server 12 may implement authorization protocols such as OAuth 2.0, and may determine whether a user of a client computer device 14 is authorized to access the private indoor map based on an authorization token received from the client computer device 14. It should be appreciated that the map server 12 may implement other types of authorization techniques and protocols not specifically described above to determine whether particular users and/or client computer devices are authorized, In the example illustrated in FIG. 7 at (A), the user is an authorized user that is able to access a private indoor map that is currently within view. In this example, the map server 12 may be configured to send the corresponding client-side renderable geometric element 82 associated with the private indoor map. The user may then access the private indoor map via a selection of the corresponding geometric element 82. On the other hand, FIG. 7 at (B) illustrates a view of a second unauthorized user of the same portion of the map. As shown, the unauthorized user was not sent the corresponding client-side renderable geometric element 82 associated with the private indoor map, and thus is not aware that the private indoor map exists. Additionally, the unauthorized user cannot select the geometric element 82 to access the private indoor map.

In another example, even if the user requests the private indoor map, the map server 12 may be configured to confirm whether the user is authorized to access the private map data. If the user is not authorized, the map server 12 will not send the private indoor map to the unauthorized user. Rather, the map server 12 may be configured to send a tile that include the bitmap image data for the outdoor map and any public indoor map available in that portion of the map.

Turning briefly back to FIG. 1, the map server 12 may be configured to determine a plurality of internal map features 84 of at least one indoor map 52. As will be discussed in more detail below, the internal map features 84 may be determined via different techniques. For example, the internal map features 84 may be determined based on metadata associated with the indoor map 52. For example, metadata associated with the indoor map 52 may indicate names, locations, and other information about entities located within the building associated with the indoor map 52. As another example, the metadata associated with the indoor map 52 may indicate notable locations within the building such as bathrooms, entrances, exits, etc. In another example, the internal map features 84 may be determined based on performing image processing on an indoor map 52 to machine-recognize internal map features of the indoor map 52.

After determining the internal map features 84, the map server 12 may be configured to generate a client-side renderable visual feature 86 for a client-side renderable geometric element 54 associated with the at least one indoor map 52. The client-side renderable visual feature may be generated to visually communicate the internal map feature 84 on the client-side renderable geometric element. For example, the client-side renderable visual feature 86 may alter a color of the geometric element, add shapes or logos to the geometric element, add images or animations to the geometric element, or otherwise add a visual feature that communicates the internal map feature 84 to the user. Several example visual features will be discussed in further detail below.

Figure 8:
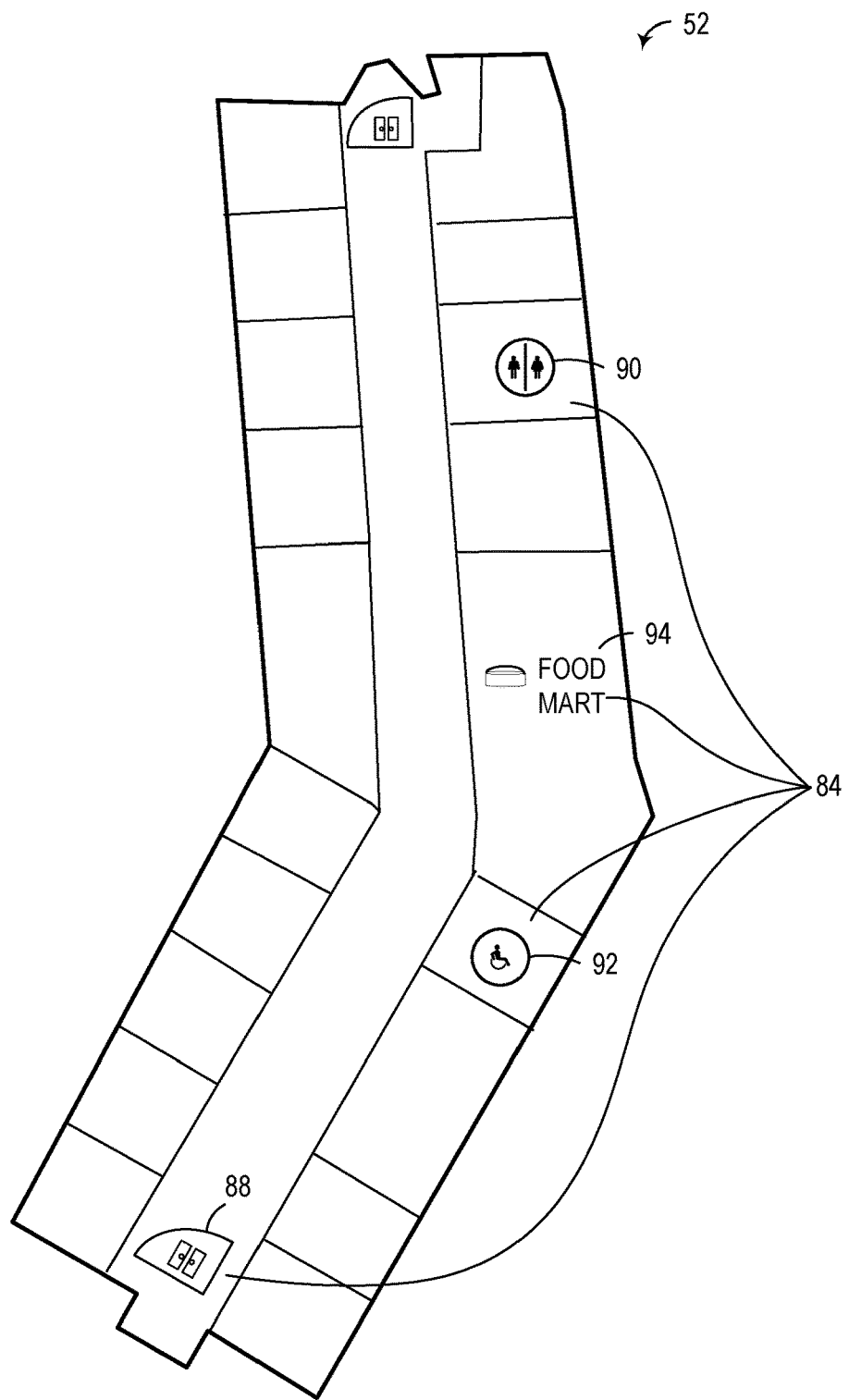
FIG. 8 shows an example indoor map including internal map features determined by the computerized mapping system of FIG. 1.

FIG. 8 illustrates an example of an indoor map 52 that includes a variety of internal map features 84 that may be machine-recognizable by the map server 12. For example, the map server 12 may be configured to perform image processing on the indoor map 52 to identify the internal map features 84 based on icons, text, or imagery included in the indoor map 52. These machine-recognizable internal map features may, for example, including an entrance/exit map feature 88, a restroom map feature 90, an Americans with Disabilities Act (ADA) compliant map feature 92, a business or retail space map feature 94, etc. It should be appreciated that the internal map features 84 that may be machine-recognized by the map server 12 are not limited to the illustrated examples. After recognizing one or more internal map features 84, the map server 12 may be configured to generate client-renderable visual features 86 that visually communicate the one or more internal map features 84. For example, the map server 12 may be configured to generate visual features 86 such as an entrance/exit indicator that may be rendered on the geometric element, a color visual feature that may indicate a type of business that is located inside the building of the indoor map, a visual indicator that a handicap accessible or publicly available bathroom is located inside the building, etc. An advantage of using machine recognition techniques to recognize internal map features 84 is that indoor maps that contain pixel data and that do not contain structured data for the internal map features 84 can be consumed by the map server 12. Alternatively, it will be appreciated that the internal map features 84 depicted in FIG. 8 may be determined from metadata associated with the indoor map by map server 12, as discussed above.

In one example, to mitigate the potential issue of visual clutter, the map server 12 may be configured to generate visual features 86 for only a subset of the plurality of recognized internal map features 84. The map server 12 may be configured to select an internal map feature from the plurality of internal map features 84 based on a selection criterion. For example, the selection criterion may be set by an authorized user associated with the at least one indoor map 52. As one example, a user who is authorized to administer a particular indoor map 52 on the map server 12 may manage the selection criterion. For example, the administrator may want to a certain business within the building to be presented via the geometric element. As another example, the administrator may want the exits and exits to the building to be presented via the geometric element to prospective visitors. In another example, the selection criterion may be set by the map server 12 or a curator of the map server 12. For example, the map server 12 may default to setting the selection criterion to show restaurants, retail locations, entrances, or restrooms as some limited examples.

Figure 9:
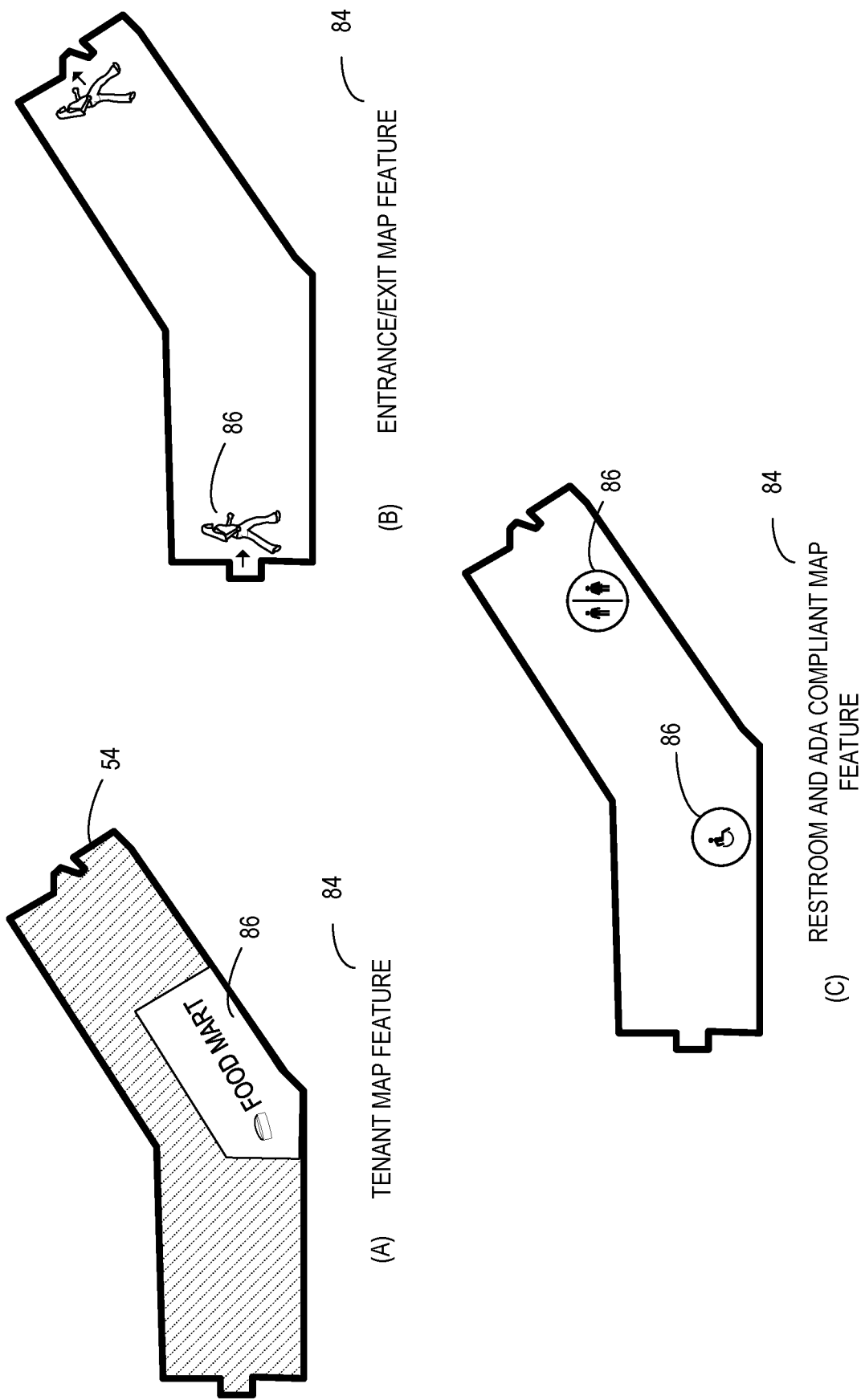
FIG. 9 shows example client-side renderable visual features that visually communicate the internal map features of FIG. 8 generated by the computerized mapping system of FIG. 1.

FIG. 9 illustrates examples of client-side renderable visual features 86 that may be rendered on the client-side renderable geometric elements 54. FIG. 9 at (A) illustrates an example renderable visual feature 86 for a selected internal map feature in the form of a tenant map feature 94. In this example, the renderable visual feature 86 includes a logo and name of a tenant that is located in the building associated with the geometric element. The tenant in this example, is a business called "Food Mart". The renderable visual feature 86 may further include a color that is selected based on the type of business of the tenant. For example, a food business (e.g., restaurant) may be associated with a first color, a retail business with a second color, a private office with a third color, an entertainment business with a fourth color, etc. The geometric elements may be rendered with different colors to visually indicated the types of businesses that included in the indoor map. In this way, the style of different internal map feature types may be set differently. Further, these styles may be set according to a style template that is stored client side, for example.

As another example, FIG. 9 at (B) illustrates a renderable visual feature 86 for an entrance/exit map feature that indicates the location of entrances or exits to the building associated with the geometric element. As discussed above, the shape of the geometric element is generated to match a building footprint or a join of all the floors in the indoor map of the building. Thus, the entrances and exits to the building may be visually indicated on the geometric element. As yet another example, FIG. 9 at (C) illustrates a renderable visual feature 86 for a restroom and/or ADA compliant map feature. Similarly to the entrance/exit map features, the renderable visual feature 86 for the restroom and/or ADA complaint map feature shown icons at corresponding positions on the geometric element 54 that correspond to the actual locations of those map features in the indoor map. It should be appreciated that the example renderable visual features and internal map features discussed above are merely exemplary, and that other types of internal map features 84 may be determined and other types of visual features may be rendered on the geometric elements 54.

Figure 10:
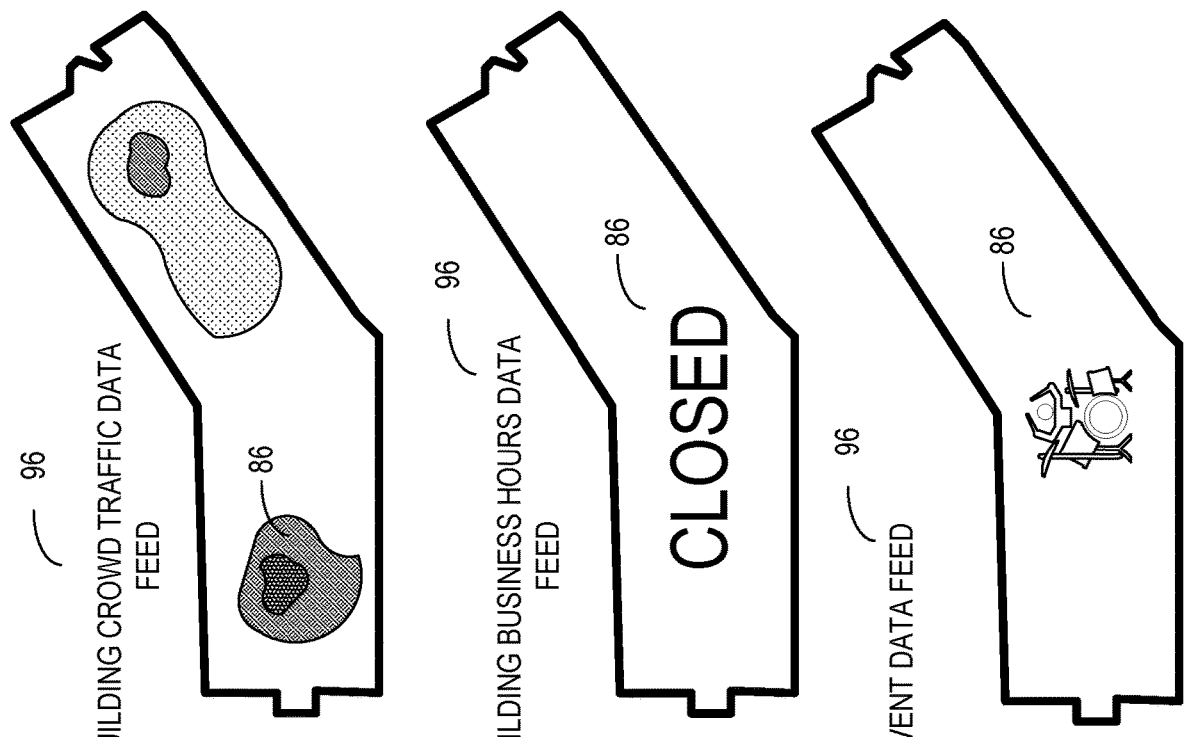
FIG. 10 shows example data feeds and associated client-renderable visual features that visually communicate a summary of the data feeds generated by the computerized mapping system of FIG. 1.
Figure 10:
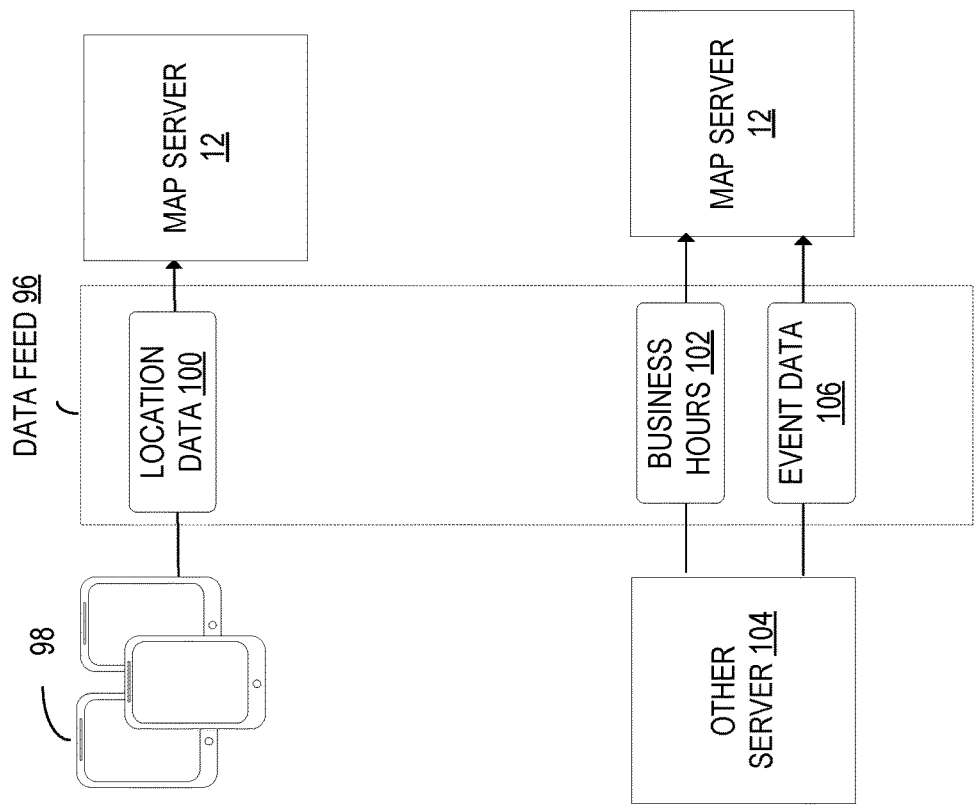

FIG. 10 illustrates examples where the renderable visual features 86 may be used to visually indicate other types of data that may be associated with the indoor map 52 or the corresponding building. In these examples, the map server 12 may be configured to receive a data feed 96 associated with the at least one indoor map 52. The data feed 96 may be received from different sources. In the example illustrated in FIG. 10 at (A), the map server 12 may be configured to receive the data feed 96 from a plurality of client devices 98 that are located within the physical building associated with the indoor map 52. That is, client devices 98 interacting with the map program of the map server 12 may send location data 100 to the map server 12. The map server 12 may be configured to aggregate the location data 100 into a building crowd traffic data feed. Next, the map server 12 may be configured to generate a client-side renderable visual feature 86 that visually communicates a summary of the data feed 96 on the client-side renderable geometric element 54. In the example illustrated in FIG. 10 at (A), the client-side renderable visual feature 86 is a graphical visual feature that represents a building crowd traffic data feed in the form of a heat map that may be shown on the geometric element 54.

As another example, FIG. 10 at (B) shows a data feed 96 for business hours data 102 for tenants or other entities of the building associated with the indoor map 52. The business hours data 102 may be received from another server 104. As a specific example, the other server 104 may be controlled by an entity that owns the building. As another example, the other server 104 may be a third party that aggregates business hours data. In either of these examples, the map server 12 may be configured to receive the data feed 96 for the business hours data 102, and may generate a visual feature 86 that visually communicates a summary of the business hours data. In the example illustrated in FIG. 10 at (B), the visual feature 86 is a text visual feature that indicates that the building is closed. As another example, the visual feature may include numbers that show the specific business hours of tenants within the building.

FIG. 10 at (C) shows a data feed 96 for event data 106 for the building associated with the indoor map 52. The event data 106 may similarly be received from another server 104, such as, for example, a server associated with an entity that owns the building, or a third party that aggregates event data. The map server 12 may be configured to generate visual features 86 that visually communicate whether an event is current occurring at the building 50 associated with the indoor map 52. In the example illustrated in FIG. 10 at (C), the visual feature 86 is an icon of a drummer that visually communicates that a music or concert event is occurring at the building 50.

It should be appreciated that the data feeds 96 and client-renderable visual features 86 discussed above are merely exemplary, and that other types of data feeds may be received from other data sources. Additionally, other forms of visual features 86 may be generated to visually communicate a summary of those data feeds. As a few non-limiting examples, the client-side renderable visual features 86 may take the form of data graphs, graphics, icons, text, numbers, colors, shading, animations, etc.

As discussed above, the style of the visual features 86 within the client-side renderable geometric element can be set to absolute values by the map server 12 when the client-side renderable geometric element is generated. Alternatively, the style of the visual features 86 can be set to a style that is assigned to a particular internal map feature type represented by each visual feature 86 according to a style template. The style template may be maintained on the client device, and applied during the client-side rendering process for the client-side renderable geometric element. Alternatively, the style template may be maintained on the map server 12, and applied at the time of generation of the client-side renderable geometric element. In this manner, a museum, for example, may set visual features 86 for all restrooms on its indoor map to a common theme or color that matches the museum's logo, for example. Or, a map platform operator may set a definition in a style template that indicates that restrooms on indoor maps should be colored blue and outlined in white bold lines, across all indoor maps in the system for ease of recognition by users of the system across various facilities and locations. Finally, it should be appreciated that in some examples, a user may customize a style template. In this way, a first user may configure their client device to display visual features 86 representing restaurants in the color red, while another user may select blue.

Figure 11:
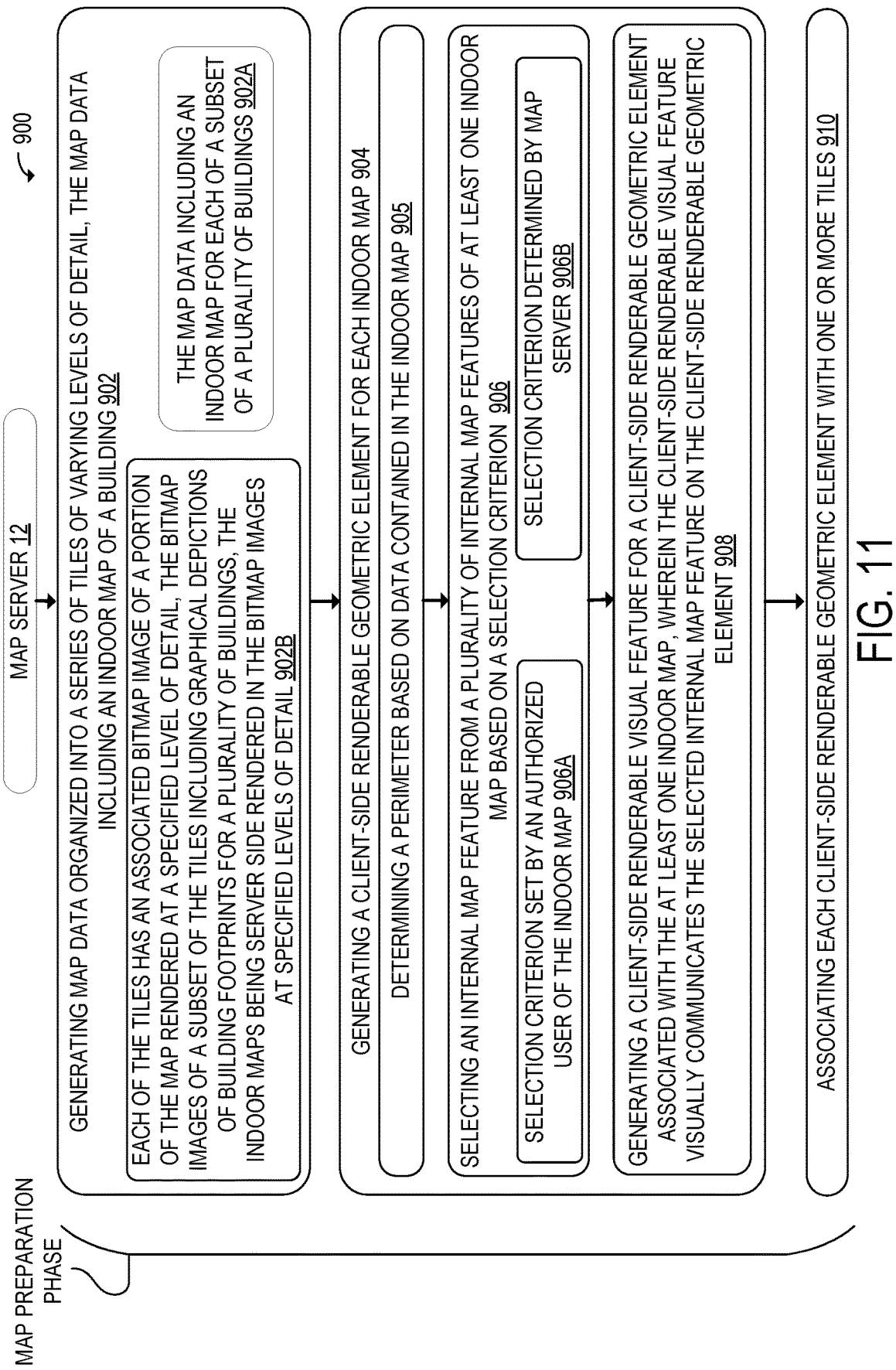
FIG. 11 shows a flowchart of an example method for computerized mapping using client-side renderable geometric elements for switching between indoor maps implemented by the computerized mapping system of FIG. 1.

FIG. 11 shows a flowchart for an example method 900 for generating client-side renderable geometric elements for computerized mapping. The method 900 may be implemented by the computer mapping system 10 of FIG. 1, or other suitable computer hardware.

Method 900 includes steps 902-910 in a map preparation phase. At 902, the method 900 may include generating map data organized into a series of tiles of varying levels of detail. The map data further includes an indoor map of a building. As shown at 902A, the indoor map may be one of a plurality of indoor maps provided for each of a subset of a plurality of buildings in the map data. Typically only some, and not all, of the buildings in the map data have indoor maps available. As shown at 902B, each of the tiles has an associated bitmap image of a portion of the map rendered at a specified level of detail. The bitmap images of a subset of the tiles include graphical depictions of building footprints for a plurality of buildings. The indoor maps are server side rendered in the bitmap images at specified levels of detail.

At 904, the method 900 may include generating a client-side renderable geometric element for the indoor map (or for each of the plurality of indoor maps when a plurality of indoor maps are provided). The client-side renderable geometric element typically includes a perimeter and a client side renderable visual feature for an internal map feature of the indoor map. The client-side renderable geometric element may be generated via different techniques, as described below.

In one example, step 904 may include steps 905, 906 and 908. At 905, method 900 includes determining a perimeter based on data contained in the indoor map. In one example, the client-side renderable geometric element may be generated based on a shape of a join of all floors of the indoor map associated with the geometric element. Alternatively to determining at 905, in other embodiments the perimeter of the client-side renderable geometric element may be generated based on a building footprint of the building associated with that geometric element, for example, using an image processing technique that constructs the outline from aerial photography images. At 906, the method 900 may include selecting an internal map feature from a plurality of internal map features of at least one indoor map based on a selection criterion. As shown at 906A, the selection criterion may be set by an authorized user of the indoor map, such as a developer, administrator, etc. who has an authorized account on the map server, by which the authorized user is authorized to access and/or edit the indoor map by means of an application programming interface of the map server, for example. The authorized user may set the selection criterion to be a particular venue, venue type, facility, facility type, room, hallway, entrance, exit, route, or other feature of the indoor map described herein to be represented by the client-side renderable visual feature. For example, map features such as a particular restroom(s), entrances, exits, businesses, etc. may be selected according to the selection criterion. Further, as described above, the selection criterion may be programmatic and based on input from data feeds as described above. As shown at 906B, alternatively, the selection criterion may be determined by the map server 12. For example, the map server may be configured to set the selection criterion to show internal map features that may be selected based on metadata associated with the indoor map. In another example, the internal map features may be determined by the map server based on machine recognition of icons, text, or other visual data of the indoor maps.

At 908, the method 900 may include generating a client-side renderable geometric element associated with the at least one indoor map to include a renderable visual feature that visually communicates the selected internal map feature after rendering at the client device. Example internal map features and renderable visual features are discussed above and illustrated in FIGS. 8-10.

At 910, the method 900 may include associating each client-side renderable geometric element with one or more tiles. Each client-side renderable geometric element may be associated with one or more tiles that include the building associated with that geometric element. Each geometric element may also be associated with tiles at specific levels of detail for the map.

Figure 12:
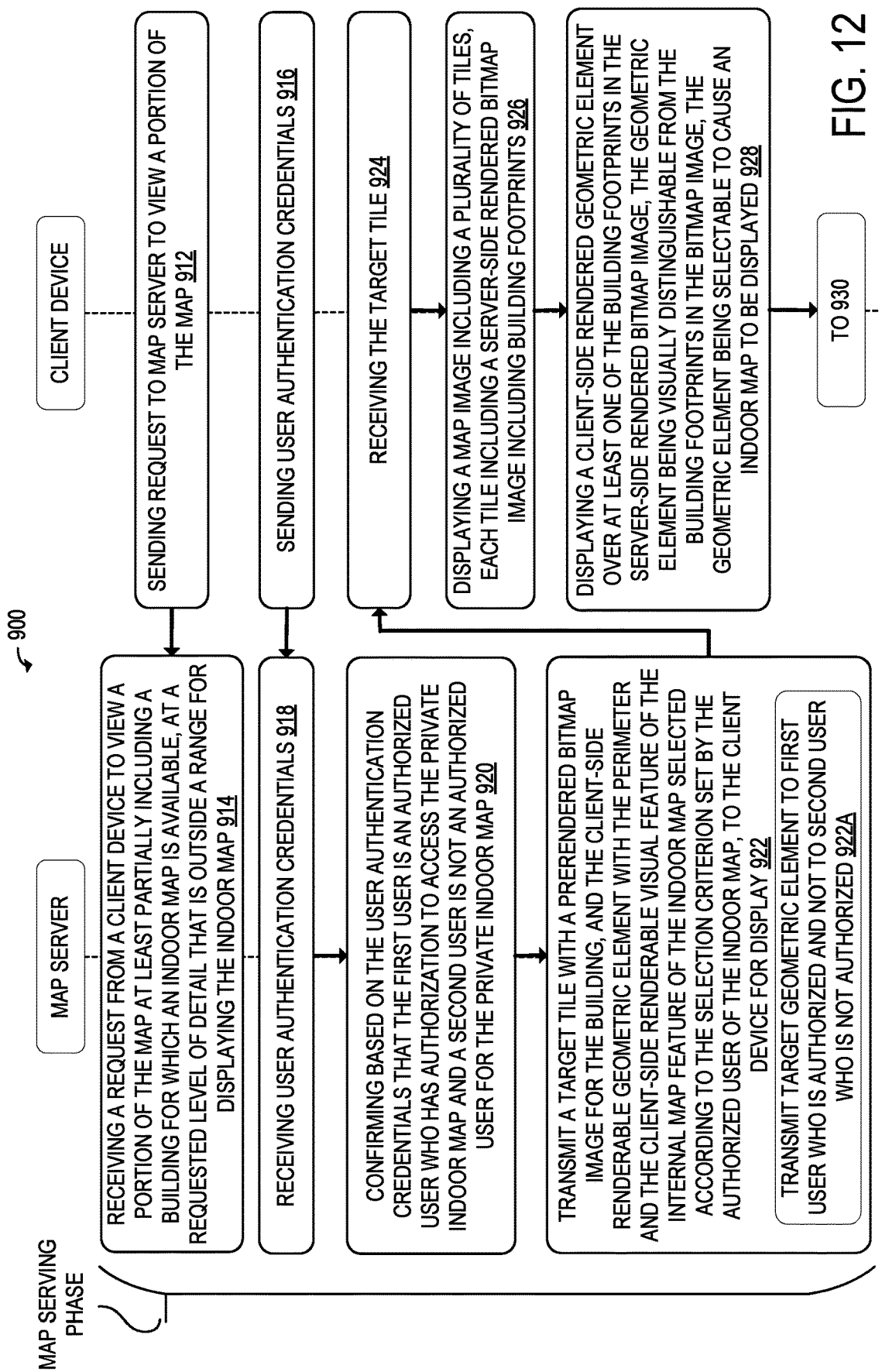
FIG. 12 continues the method of FIG. 11.

FIG. 12 shows a flowchart that continues the method 900 of FIG. 11 with a map serving phase. At 912, the method 900 may include sending, from a client device, a request to a map server to view a portion of a map at least partially including a building for which an indoor map is available. At 914, the method 900 may include receiving, at the map server, the request from the client device to view a portion of the map at least partially including the building for which the indoor map is available, at a requested level of detail that is outside a range for displaying the indoor map. The request may be for a particular tile on which the building is at least partially located.

At 916, the method 900 may include, at the client device, sending user authentication credentials to the map server. The user authentication credentials may, for example, include an OAuth 2.0 token, an account login/password, or another type credential for an authentication protocol.

At 918, the method 900 may include, at the map server, receiving user authentication credentials from a first user and a second user. That is, the map server may be configured to communicate with a plurality of client devices. Each client device may be configured to send user authentication credentials to the map server.

At 920, the method 900 may include confirming based on the user authentication credentials that the first user is an authorized user who has authorization to access the private indoor map and a second user is not an authorized user for the private indoor map.

At 922, the method 900 may include transmitting a target tile with a prerendered bitmap image for the building, and the client-side renderable geometric element with the perimeter and the client-side renderable visual feature of the internal map feature of the indoor map selected according to the selection criterion set by the authorized user of the indoor map, to the client device for display. As shown at 922A, in one example, the method may include an access control scheme in which only authorized users can view the target client-side renderable geometric element. Thus, the method may include transmitting the target client-side renderable geometric element to a first user who is authorized and not to a second user who is not authorized. Put another way, the method may include transmitting the target tile with a prerendered bitmap image including a building, and a target client-side renderable geometric element to the client device of the first user for display, and transmitting the target tile with the prerendered bitmap image including the building, without the target client-side renderable geometric element to the client device of the second user for display.

At 924, the method 900 may include, at the client device, receiving the target tile. As discussed above, a first client device for the first user may receive the target tile and the target client-side renderable geometric element for display. On the other hand, the second client device for the second user that was not authentication may receive the target tile without the target client-side renderable geometric element.

At 926, the method 900 may include displaying a map image including a plurality of tiles, each tile including a server-side rendered bitmap image including building footprints. FIG. 5 illustrates an example of a displayed map image that includes four tiles. The set of tiles includes a plurality of building footprints and client-side rendered geometric elements.

At 928, the method 900 may include displaying a client-side rendered geometric element over at least one of the building footprints in the server-side rendered bitmap image, the geometric element being visually distinguishable from the building footprints in the bitmap image, the geometric element being selectable to cause an indoor map to be displayed.

Figure 13:
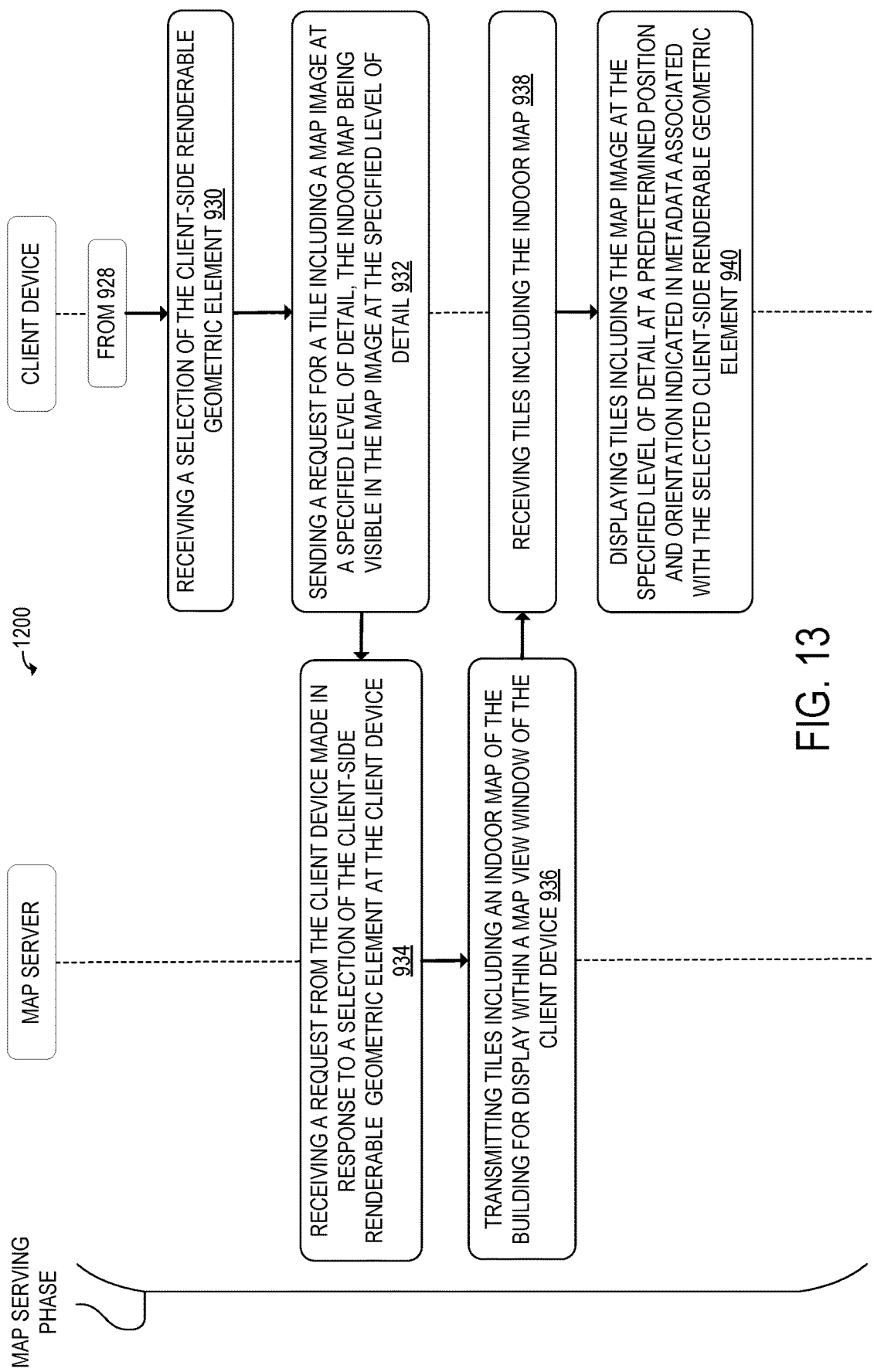
FIG. 13 continues the method of FIG. 12.

FIG. 13 continues the method 900 of FIG. 12. At 930, the method 900 may include receiving a selection of the client-side renderable geometric element. The user may select the geometric element via a click input using an input device of the client device. As the first client device of the first user received the client-side renderable geometric element, the user may interact with the client-side renderable geometric element such as by selecting the element via a click. On the other hand, the second client device of the second user did not receive the client-side renderable geometric element. Thus, the user may not be able to interact with the geometric element.

At 932, the method 900 may include sending a request for a tile including a map image at a specified level of detail, the indoor map being visible in the map image at the specified level of detail. At 934, the method 900 may include, at the map server, receiving a request from the client device made in response to a selection of the client-side renderable geometric element at the client device.

At 936, the method 900 may include transmitting tiles including an indoor map of the building for display within a map view window of the client device. At 938, the method 900 may include, at the client device, receiving the tiles including the indoor map.

At 940, the method 900 may include displaying tiles including the map image at the specified level of detail at a predetermined position and orientation indicated in metadata associated with the selected client-side renderable geometric element. It will be appreciated that receiving the selection of the client-side renderable geometric element causes the tile including the map image at the specified level of detail to be displayed in this manner. The user may switch to a different floor map by selecting a different client-side renderable geometric element in the map.

Using the techniques described above, interactable polygons for buildings may be displayed at geospatially correct positions on a map. Users may interact with these polygons to view specific indoor maps. In this manner, the potentially noisy indoor map data is not shown until desired by the user, thus reducing the potential of visual clutter on the map from client-side rendered features. These interactable polygons also provide an intuitive modality for users to interact with and view different indoor maps.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
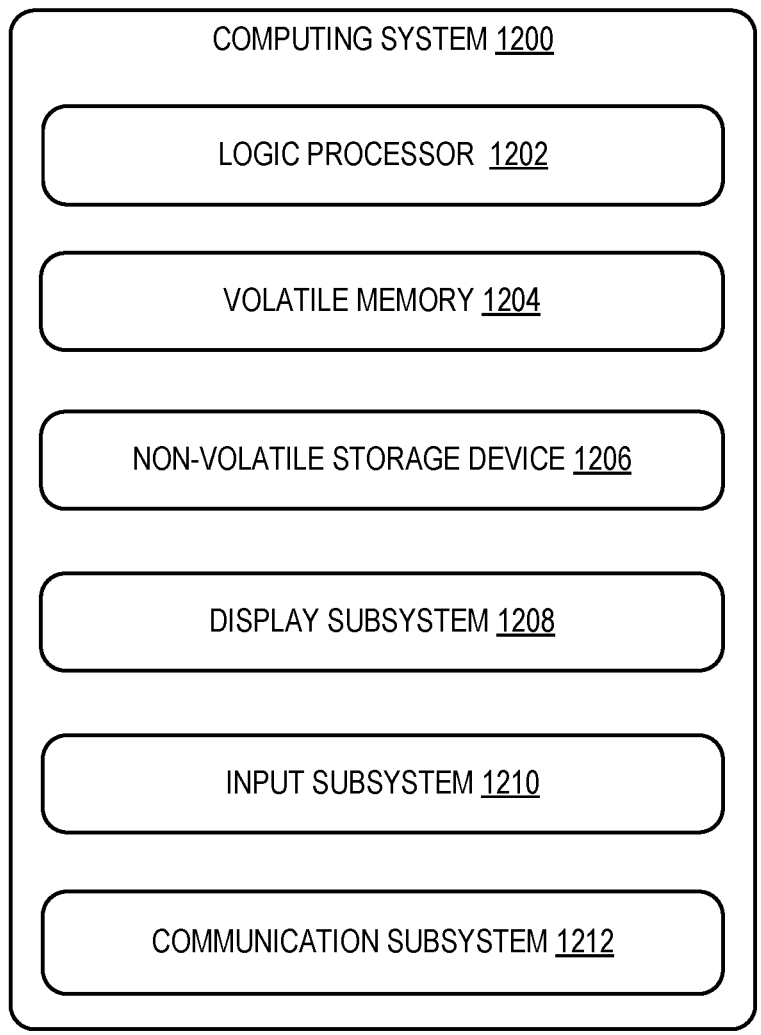
FIG. 14 shows a schematic view of an example computing environment in which the computer device of FIG. 1 may be enacted.

FIG. 14 schematically shows a non-limiting embodiment of a computing system 1200 that can enact one or more of the methods and processes described above. Computing system 1200 is shown in simplified form. Computing system 1200 may embody the computerized mapping system 10 described above and illustrated in FIG. 1. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202 volatile memory 1204, and a non-volatile storage device 1206. Computing system 1200 may optionally include a display subsystem 1208, input subsystem 1210, communication subsystem 1212, and/or other components not shown in FIG. 14.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1200 to send and/or receive messages to and/or from other devices via a network such as the Internet.

Further, the disclosure comprises configurations according to the following clauses.

Clause 1. A computerized mapping system (10), comprising: a map server (12) configured to: in a map data preparation phase: generate map data (34) organized into a series of tiles (40) of varying levels of detail (42), the map data (34) including an indoor map (52) of a building (50); generate a client-side renderable geometric element (54) including a perimeter of the building (50) and a client-side renderable visual feature (86) of an internal map feature (84) of the indoor map (52), at least in part by: determining the perimeter based on data contained in the indoor map; selecting an internal map feature (84) from the plurality of internal map features (84) based on a selection criterion set by an authorized user of the indoor map (52); generating the client-side renderable visual feature (86) for the selected internal map feature, to visually communicate the selected internal map feature (84) on the client-side renderable geometric element (54); associate the client-side renderable geometric element (54) with one or more tiles (40); in a map serving phase: receive a request from a client device (14) to view a portion of the map at least partially including the building (50) for which the indoor map (52) is available at a requested level of detail that is outside a range for displaying the indoor map (52); transmit the target tile (56) with a prerendered bitmap image (58) for the building, and the client-side renderable geometric element (54) with the perimeter and the client-side renderable visual feature (86) of the internal map feature (84) of the indoor map (52) selected according to the selection criterion set by the authorized user of the indoor map (52), to the client device for display.

Clause 2. The computerized mapping system of clause 1, wherein the map server (12) is further configured to: in the map serving phase: receive a request from the client device (14) made in response to a selection of the client-side renderable geometric element (54) at the client device; and transmit tiles including an indoor map (52) of the building for display within a map view window of the client device (14).

Clause 3. The computerized mapping system of any one of clauses 1 and 2, wherein the plurality of internal map features are selected from the group consisting of an entrance location map feature, an exit location map feature, a public facility location map feature, and a tenant map feature.

Clause 4. The computerized mapping system of any one of clauses 1-3, wherein the map server is further configured to receive a data feed associated with the at least one indoor map, and wherein the client-side renderable visual feature visually communicates a summary of the data feed on the client-side renderable geometric element.

Clause 5. The computerized mapping system of clause 4, wherein the received data feed associated with the indoor map is selected from the group consisting of a building crowd traffic data feed, a building business hours data feed, and an event data feed.

Clause 6. The computerized mapping system of clauses 1-5 wherein the client-side renderable geometric element is a two-dimensional polygon formed in a location of one of the buildings, and wherein the polygon is shaped to be coextensive with a shape formed by a join of all floors of the indoor map of the building.

Clause 7. The computerized mapping system of any one of clauses 1-6, wherein the indoor map is a private indoor map accessible only by authorized users; and the map server is further configured to receive user authentication credentials, and confirm based on the user authentication credentials that the user is an authorized user who has authorization to access the indoor map, prior to transmitting the tiles containing the indoor map to the client device. Clause 8. The computerized mapping system of any one of clauses 1-7, wherein the map data is organized into a series of tiles of varying levels of detail, each of the tiles having an associated bitmap image of a portion of the map rendered at a specified level of detail, the bitmap images of a subset of the tiles including graphical depictions of a building footprint for the building, and the indoor map is server-side rendered and is mergeable with the bitmap images at specified levels of detail; and the client-side renderable geometric element is associated with metadata that indicates a predetermined level of detail and a predetermined position and orientation to display a tile that includes the indoor map associated with the client-side renderable geometric element within the map view window.

Clause 9. A computerized mapping method (900), comprising: at a map server comprising a processor and associated memory storing instructions that when executed cause the processor to perform steps of: in a map data preparation phase: generating (902) map data organized into a series of tiles of varying levels of detail, each of the tiles having an associated bitmap image of a portion of the map rendered at a specified level of detail, the bitmap images of a subset of the tiles including graphical depictions of building footprints for a plurality of buildings, the map data further including an indoor map for each of a subset of the plurality of buildings, the indoor maps being server side rendered in the bitmap images at specified levels of detail, wherein at least one indoor map is a private indoor map accessible only by authorized users; generating (904) a client-side renderable geometric element for each indoor map; associating (910) each client-side renderable geometric element with one or more tiles; in a map serving phase: receiving (914) requests from a client device of a first user and a client device of a second user to view a portion of the map at least partially including a target tile at a requested level of detail that is outside a range for displaying the private indoor map; receiving (918) user authentication credentials from the first user and the second user; confirming (920) based on the user authentication credentials that the first user is an authorized user who has authorization to access the private indoor map and a second user is not an authorized user for the private indoor map; transmitting (922) the target tile with a prerendered bitmap image including a building, and a target client-side renderable geometric element to the client device of the first user for display; and transmitting (922) the target tile with the prerendered bitmap image including the building, without the target client-side renderable geometric element to the client device of the second user for display.

Clause 10. The computerized mapping method of clause 9, further comprising: receiving (936) a request from the client device of the first user made in response to a selection of the target client-side renderable geometric element at the client device; and transmitting (938) tiles including the private indoor map of the building for display within a map view window of the client device of the first user.

Clause 11. The computerized mapping method of clause 9, wherein the geometric element is a two-dimensional polygon formed in a location of one of the buildings.

Clause 12. The computerized mapping method of clause 11, wherein the polygon is shaped to be coextensive with a shape formed by a join of all floors of the indoor map of the building.

Clause 13. The computerized mapping method of any one of clauses 9-12, wherein in the map data preparation phase, generating the client-side renderable geometric element for each indoor map is accomplished at least in part by: determining the perimeter based on data contained in the indoor map: determining a plurality of internal map features of at least one indoor map; selecting an internal map feature from the plurality of internal map features based on a selection criterion; and generating a client-side renderable visual feature for a client-side renderable geometric element associated with the at least one indoor map, wherein the client-side renderable visual feature visually communicates the selected internal map feature on the client-side renderable geometric element.

Clause 14. A computerized mapping method (900), comprising: displaying (926) a map image including a plurality of tiles, each tile including a server-side rendered bitmap image including building footprints; displaying (928) a client-side rendered geometric element over at least one of the building footprints in the server-side rendered bitmap image, the geometric element being visually distinguishable from the building footprints in the bitmap image, the geometric element being selectable to cause an indoor map to be displayed, the geometric element being rendered to include a visual feature that visually communicates an internal map feature of the indoor map; receiving a selection of the geometric element; and in response to receiving the selection, causing a server-side rendered indoor map of the building to be displayed.

Clause 15. The computerized mapping method of clause 14, wherein receiving the selection of the geometric element causes a request to be sent for a tile including a map image at a specified level of detail, the indoor map being visible in the map image at the specified level of detail.

Clause 16. The computerized mapping method of any one of clauses 14-15, wherein performing a change in level of detail or a repositioning of the map causes a client-side animation that visually distinguishes the geometric element.

Clause 17. The computerized mapping method of clause 15, wherein receiving the selection of the geometric element causes the tile including the map image at the specified level of detail to be displayed at a predetermined position and orientation indicated in metadata associated with the selected geometric element.

Clause 18. The computerized mapping method of any one of clauses 14-17, further comprising, detecting a pointer or digit hovering over the geometric element, and in response, changing the visual appearance of the geometric element at the client.

Clause 19. The computerized mapping method of any one of clauses 14-18, wherein the geometric element is rendered to include a visually distinguishing characteristic selected from the group consisting of a highlight, outline, color, shading, line pattern, line weight, fill pattern, and brightness, the visually distinguishing characteristic serving to distinguish the client-side rendered geometric element from the server side rendered building footprints when displayed at the client device.

Clause 20. The computerized mapping method of any one of clauses 14-19, wherein the geometric element is rendered to have a perimeter that is visually distinguished with a bold line weight compared to server-side rendered building footprints.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
 receiving a request to view a portion of map data that includes a building with an indoor map at a requested level of detail;
 identifying a tile from the map data that includes a bitmap image of the building;
 identifying a geometric element associated with the tile from the map data, wherein the geometric element includes the indoor map at the requested level of detail; and
 sending the tile with the bitmap image of the building and the geometric element with the indoor map for presentation at a client device, wherein the indoor map is merged with the bitmap image of the building and the indoor map is presented at the requested level of detail.

2. The method of claim 1, wherein the geometric element includes a perimeter of the building and at least one visual feature of an internal map feature of the indoor map.

3. The method of claim 1, wherein the map data includes a plurality of tiles with bitmap images of varying levels of detail associated with different thresholds of zoom levels on the client device.

4. The method of claim 1, wherein the indoor map is one of a plurality of indoor maps provided for the building, where the plurality of indoor maps include different level of detail associated with different thresholds of zoom levels on the client device.

5. The method of claim 1, wherein the indoor map is merged with the bitmap image by overlaying the geometric element on top of the bitmap image of the building.

6. The method of claim 1, wherein the indoor map is merged with the bitmap image by: rendering the indoor map in the bitmap image for the tile, wherein the bitmap image includes image data for outdoors map information, graphical depictions of a building footprint for the building, and the indoor map.

7. The method of claim 1, wherein the tile includes geospatial reference data for the tile and the indoor map is geospatially referenced in the geospatial reference data.

8. The method of claim 1, wherein the bitmap image includes a graphical depiction for a footprint of the building and the geometric element is visually distinguishable from the footprint of the building.

9. The method of claim 1, further comprising:
receiving another request from the client device to view the portion of the map data that includes the building with the indoor map at a different requested level of detail;
identifying the tile from the map data that includes the bitmap image of the building at the different requested level of detail;
identifying the geometric element associated with the tile from the map data, wherein the geometric element includes the indoor map at the different requested level of detail; and
sending, to the client device, the tile with the bitmap image of the building and the geometric element with the indoor map for presentation at the client device.

10. The method of claim 1, further comprising:
receiving user authentication credentials for a user of the client device;
confirming access to the indoor map for the user based on the user authentication credentials;
sending the tile with the bitmap image of the building and the geometric element with the indoor map for presentation at the client device in response to confirming access to the indoor map for the user; and
sending the tile with the bitmap image of the building for presentation at the client device without the geometric element with the indoor map in response to confirming the user is unauthorized to access the indoor map.

11. A device, comprising:
one or more processors;
memory in electronic communication with the one or more processors; and
instructions stored in the memory, the instructions executable by the one or more processors to:
receive a request to view a portion of map data that includes a building with an indoor map at a requested level of detail;
identify a tile from the map data that includes a bitmap image of the building;
identify a geometric element associated with the tile from the map data, wherein the geometric element includes the indoor map at the requested level of detail; and
send the tile with the bitmap image of the building and the geometric element with the indoor map for presentation at a client device, wherein the indoor map is merged with the bitmap image of the building and the indoor map is presented at the requested level of detail.

12. The device of claim 11, wherein the geometric element includes a perimeter of the building and at least one visual feature of an internal map feature of the indoor map.

13. The device of claim 11, wherein the map data includes a plurality of tiles with bitmap images of varying levels of detail associated with different thresholds of zoom levels on the client device.

14. The device of claim 11, wherein the indoor map is one of a plurality of indoor maps provided for the building, where the plurality of indoor maps include different level of detail associated with different thresholds of zoom levels on the client device.

15. The device of claim 11, wherein the indoor map is merged with the bitmap image by overlaying the geometric element on top of the bitmap image of the building.

16. The device of claim 11, wherein the instructions are executable by the one or more processors to merge the indoor map with the bitmap image by rendering the indoor map in the bitmap image for the tile, wherein the bitmap image includes image data for outdoors map information, graphical depictions of a building footprint for the building, and the indoor map.

17. The device of claim 11, wherein the tile includes geospatial reference data for the tile and the indoor map is geospatially referenced in the geospatial reference data.

18. The device of claim 11, wherein the bitmap image includes a graphical depiction for a footprint of the building and the geometric element is visually distinguishable from the footprint of the building.

19. The device of claim 11, wherein the instructions are further executable by the one or more processors to:
receive another request from the client device to view the portion of the map data that includes the building with the indoor map at a different requested level of detail;
identify the tile from the map data that includes the bitmap image of the building at the different requested level of detail;
identify the geometric element associated with the tile from the map data, wherein the geometric element includes the indoor map at the different requested level of detail; and
send, to the client device, the tile with the bitmap image of the building and the geometric element with the indoor map for presentation at the client device.

20. The device of claim 11, wherein the instructions are further executable by the one or more processors to:
receive user authentication credentials for a user of the client device;
confirm access to the indoor map for the user based on the user authentication credentials;
send the tile with the bitmap image of the building and the geometric element with the indoor map for presentation at the client device in response to confirming access to the indoor map for the user; and
send the tile with the bitmap image of the building for presentation at the client device without the geometric element with the indoor map in response to confirming the user is unauthorized to access the indoor map.

* * * * *